US 8,170,847 B2

(12) United States Patent
Jain et al.

(10) Patent No.: US 8,170,847 B2
(45) Date of Patent: May 1, 2012

(54) SYSTEM AND METHOD FOR EVALUATING SIMULATION MODEL PENETRATION

(75) Inventors: Manisha Jain, New York, NY (US); Michael Shamai Oralevich, Great Neck, NY (US); Sandeep K. Sacheti, Edison, NJ (US); Deep Thomas, East Brunswick, NJ (US); Donald Robert McGimpsey, South Plainfield, NJ (US)

(73) Assignee: American Express Travel Related Services Company, Inc., New York, NY (US)

( * ) Notice: Subject to any disclaimer, the term of this patent is extended or adjusted under 35 U.S.C. 154(b) by 603 days.

(21) Appl. No.: 11/619,947

(22) Filed: Jan. 4, 2007

(65) Prior Publication Data
US 2008/0126034 A1 May 29, 2008

Related U.S. Application Data

(63) Continuation of application No. 11/564,341, filed on Nov. 29, 2006.

(51) Int. Cl.
G06F 9/45 (2006.01)
G06F 7/00 (2006.01)
G06Q 10/00 (2006.01)

(52) U.S. Cl. ............................. 703/6; 705/348; 707/736

(58) Field of Classification Search ........ 703/6; 705/7–9, 705/348; 707/736
See application file for complete search history.

(56) References Cited

U.S. PATENT DOCUMENTS

| | | | |
|---|---|---|---|
| 4,965,743 A | 10/1990 | Malin et al. | |
| 5,428,712 A | 6/1995 | Elad et al. | |
| 6,094,465 A | 7/2000 | Stein et al. | |
| 6,094,654 A | 7/2000 | Van Huben et al. | |
| 6,145,121 A | 11/2000 | Levy et al. | |
| 6,295,513 B1 | 9/2001 | Thackston | |
| 6,324,495 B1 | 11/2001 | Steinman | |
| 6,473,084 B1 | 10/2002 | Phillips et al. | |
| 6,983,237 B2 * | 1/2006 | Paterson et al. | 703/22 |
| 7,363,578 B2 | 4/2008 | Bendsen et al. | |
| 7,490,029 B2 | 2/2009 | Wasynczuk et al. | |
| 7,664,729 B2 | 2/2010 | Klein et al. | |
| 7,707,200 B2 | 4/2010 | Jain et al. | |
| 2003/0126151 A1 * | 7/2003 | Jung | 707/100 |
| 2004/0073528 A1 * | 4/2004 | Tang et al. | 706/21 |
| 2004/0073565 A1 | 4/2004 | Kaufman et al. | |
| 2005/0248573 A1 | 11/2005 | Grassia et al. | |

(Continued)

OTHER PUBLICATIONS

Office Action U.S. Appl. No. 11/564,341 Dated Jul. 6, 2009.

(Continued)

*Primary Examiner* — Dwin M Craig
*Assistant Examiner* — Juan Ochoa
(74) *Attorney, Agent, or Firm* — Snell & Wilmer L.L.P.

(57) ABSTRACT

A system and method for viewing models and model variables within a sophisticated modeling environment is disclosed. The system provides varying levels of insight into a modeling infrastructure to help the user understand model and model variable dependencies, usage, distribution, and/or the like. (original) The method includes storing model and model variable data within a relational database system, receiving a request from a user interfacing with the system via a web interface, extracting search criteria and presentation preferences from the request, formulating and executing one or more queries on the database to retrieve the required data, formatting the data in accordance with the request, and retuning the data to the requesting user in the form of a web page.

20 Claims, 16 Drawing Sheets

U.S. PATENT DOCUMENTS

| | | | | |
|---|---|---|---|---|
| 2005/0251371 | A1* | 11/2005 | Chagoly et al. | 703/1 |
| 2007/0118555 | A1* | 5/2007 | Go et al. | 707/103 R |
| 2007/0188555 | A1 | 8/2007 | Silverbrook | |
| 2007/0250295 | A1 | 10/2007 | Murray et al. | |
| 2008/0126034 | A1 | 5/2008 | Jain et al. | |
| 2008/0126313 | A1* | 5/2008 | Jain et al. | 707/3 |
| 2008/0189349 | A1 | 8/2008 | Krig | |
| 2008/0229387 | A1 | 9/2008 | Baks et al. | |
| 2009/0164200 | A1 | 6/2009 | Wasynczuk et al. | |
| 2010/0107095 | A1 | 4/2010 | Singh et al. | |

OTHER PUBLICATIONS

Office Action U.S. Appl. No. 11/564,968 Dated Jul. 8, 2009.
Office Action U.S. Appl. No. 11/565,178 Dated Jul. 6, 2009.
Office Action U.S. Appl. No. 11/616,426 Dated Oct. 9, 2008.
Final Office Action U.S. Appl. No. 11/616,426 Dated Apr. 24, 2009.
Office Action U.S. Appl. No. 11/616,482 Dated Sep. 30, 2008.
Final Office Action U.S. Appl. No. 11/616,482 Dated Mar. 20, 2009.
Advisory Action U.S. Appl. No. 11/616,482 Dated May 19, 2009.
Office Action U.S. Appl. No. 11/616,482 Dated Jul. 13, 2009.
Office Action U.S. Appl. No. 11/616,502 Dated Dec. 15, 2008.
Final Office Action U.S. Appl. No. 11/616,502 Dated Apr. 24, 2009.
Advisory Action U.S. Appl. No. 11/616,502 Dated May 27, 2009.
Office Action U.S. Appl. No. 11/616,514 Dated Jul. 8, 2009.
Office Action U.S. Appl. No. 11/616,527 Dated Sep. 26, 2008.
Final Office Action U.S. Appl. No. 11/616,527 Dated Mar. 17, 2009.
Advisory Action U.S. Appl. No. 11/616,527 Dated May 21, 2009.
Office Action U.S. Appl. No. 11/616,527 Dated Jul. 14, 2009.
Office Action U.S. Appl. No. 11/619,879 Dated Jul. 17, 2009.
Office Action U.S. Appl. No. 11/619,911 Dated Oct. 2, 2008.
Final Office Action U.S. Appl. No. 11/619,911 Dated Mar. 19, 2009.
Advisory Action U.S. Appl. No. 11/619,911 Dated May 19, 2009.
Office Action U.S. Appl. No. 11/619,911 Dated Jul. 13, 2009.
Office Action U.S. Appl. No. 11/619,927 Dated Jul. 17, 2009.
Office Action U.S. Appl. No. 11/619,942 Dated Jul. 17, 2008.
Final Office Action U.S. Appl. No. 11/619,942 Dated May 6, 2009.
Advisory Action U.S. Appl. No. 11/619,942 Dated Jun. 2, 2009.
Office Action U.S. Appl. No. 11/619,942 Dated Aug. 21, 2009.
Office Action U.S. Appl. No. 11/619,947 Dated Jul. 7, 2009.
Office Action U.S. Appl. No. 11/619,963 Dated Jul. 7, 2009.
Office Action U.S. Appl. No. 11/619,971 Dated Nov. 13, 2008.
Final Office Action U.S. Appl. No. 11/619,971 Dated May 6, 2009.
Advisory Action U.S. Appl. No. 11/619,971 Dated Jun. 2, 2009.
Office Action U.S. Appl. No. 11/619,971 Dated Aug. 21, 2009.
U.S. Appl. No. 11/564,341, Final Office Action dated Nov. 23, 2009.
U.S. Appl. No. 11/565,178, Final Office Action dated Nov. 23, 2009.
U.S. Appl. No. 11/616,426, Notice of Allowance dated Oct. 20, 2009.
U.S. Appl. No. 11/616,465, Office Action dated Dec. 4, 2009.
U.S. Appl. No. 11/616,482, Final Office Action dated Nov. 10, 2009.
U.S. Appl. No. 11/616,514, Final Office Action dated Nov. 20, 2009.
U.S. Appl. No. 11/619,879, Final Office Action dated Nov. 27, 2009.
U.S. Appl. No. 11/619,955, Office Action dated Sep. 22, 2009.
U.S. Appl. No. 11/619,975, Office Action dated Sep. 23, 2009.
USPTO; Final Office Action mailed Jan. 6, 2010 in U.S. Appl. No. 11/564,968.
USPTO; Final Office Action mailed Apr. 7, 2010 in U.S. Appl. No. 11/616,465.
USPTO; Office Action mailed Jan. 15, 2010 in U.S. Appl. No. 11/616,482.
USPTO; Final Office Action mailed Apr. 14, 2010 in U.S. Appl. No. 11/616,482.
USPTO; Notice of Allowance mailed May 17, 2010 in U.S. Appl. No. 11/616,482.
USPTO; Notice of Allowance mailed Mar. 8, 2010 in U.S. Appl. No. 11/616,502.
USPTO; Final Office Action mailed Dec. 18, 2009 in U.S. Appl. No. 11/616,527.
USPTO; Office Action mailed Apr. 12, 2010 in U.S. Appl. No. 11/616,527.
USPTO; Notice of Allowance mailed May 7, 2010 in U.S. Appl. No. 11/616,527.
USPTO; Final Office Action mailed Dec. 18, 2009 in U.S. Appl. No. 11/619,911.
USPTO; Notice of Allowance mailed Apr. 13, 2010 in U.S. Appl. No. 11/619,911.
USPTO; Final Office Action mailed Feb. 2, 2010 in U.S. Appl. No. 11/619,927.
USPTO; Final Office Action mailed Dec. 30, 2009 in U.S. Appl. No. 11/619,942.
USPTO; Final Office Action mailed Jan. 4, 2010 in U.S. Appl. No. 11/619,947.
USPTO; Final Office Action mailed Jan. 22, 2010 in U.S. Appl. No. 11/619,955.
USPTO; Final Office Action mailed Dec. 31, 2009 in U.S. Appl. No. 11/619,963.
USPTO; Final Office Action mailed Dec. 28, 2009 in U.S. Appl. No. 11/619,975.
USPTO; Office Action mailed Dec. 11, 2009 in U.S. Appl. No. 11/619,982.
USPTO; Final Office Action mailed Apr. 7, 2010 in U.S. Appl. No. 11/619,982.
USPTO; Advisory Action dated Oct. 14, 2010 in U.S. Appl. No. 11/564,341.
USPTO; Advisory Action dated Oct. 15, 2010 in U.S. Appl. No. 11/564,968.
USPTO; Advisory Action dated Nov. 29, 2010 in U.S. Appl. No. 11/565,178.
USPTO; Advisory Action dated Feb. 28, 2011 in U.S. Appl. No. 11/616,465.
USPTO; Final Office Action dated Jan. 20, 2011 in U.S. Appl. No. 11/616,465.
USPTO; Advisory Action dated Oct. 15, 2010 in U.S. Appl. No. 11/616,514.
USPTO; Advisory Action dated Dec. 1, 2010 in U.S. Appl. No. 11/619,879.
USPTO; Advisory Action dated Feb. 28, 2011 in U.S. Appl. No. 11/619,927.
USPTO; Final Office Action dated 01/21/201 in U.S. Appl. No. 11/619,927.
USPTO; Final Office Action dated Jan. 20, 2011 in U.S. Appl. No. 11/619,982.
USPTO; Advisory Action dated Feb. 28, 2011 in U.S. Appl. No. 11/619,955.
USPTO; Final Office Action dated Jan. 20, 2011 in U.S. Appl. No. 11/619,955.
USPTO; Advisory Action dated Nov. 30, 2010 in U.S. Appl. No. 11/619,963.
USPTO; Advisory Action dated Nov. 30, 2010 in U.S. Appl. No. 11/619,975.
USPTO; Advisory Action dated Mar. 1, 2011 in U.S. Appl. No. 11/619,982.
USPTO; Office Action dated Jun. 23, 2010 in U.S. Appl. No. 11/564,341.
USPTO; Final Office Action dated Sep. 1, 2010 in U.S. Appl. No. 11/564,341.
USPTO; Office Action dated Jun. 23, 2010 in U.S. Appl. No. 11/564,968.
USPTO; Final Office Action dated Sep. 1, 2010 in U.S. Appl. No. 11/564,968.
USPTO; Office Action dated Jun. 25, 2010 in U.S. Appl. No. 11/565,178.
USPTO; Final Office Action dated Sep. 15, 2010 in U.S. Appl. No. 11/565,178.
USPTO; Office Action dated Jul. 12, 2010 in U.S. Appl. No. 11/616,415.
USPTO; Notice of Allowance dated Aug. 24, 2010 in U.S. Appl. No. 11/616,415.
USPTO; Advisory Action dated Jun. 17, 2010 in U.S. Appl. No. 11/616,465.
USPTO; Office Action dated Sep. 15, 2010 in U.S. Appl. No. 11/616,465.
USPTO; Office Action dated Jun. 24, 2010 in U.S. Appl. No. 11/616,514.

USPTO; Final Office Action dated Sep. 2, 2010 in U.S. Appl. No. 11/616,514.
USPTO; Office Action dated Aug. 20, 2010 in U.S. Appl. No. 11/619,879.
USPTO; Final Office Action Sep. 21, 2010 in U.S. Appl. No. 11/619,879.
USPTO; Office Action Sep. 15, 2010 in U.S. Appl. No. 11/619,927.
USPTO; Office Action Jul. 20, 2010 in U.S. Appl. No. 11/619,942.
USPTO; Notice of Allowance dated Aug. 30, 2010 in U.S. Appl. No. 11/619,942.
USPTO; Office Action dated Aug. 23, 2010 in U.S. Appl. No. 11/619,947.
USPTO; Final Office Action dated Sep. 21, 2010 in U.S. Appl. No. 11/619,947.
USPTO; Office Action dated Sep. 21, 2010 in U.S. Appl. No. 11/619,955.
USPTO; Office Action dated Aug. 24, 2010 in U.S. Appl. No. 11/619,963.
USPTO; Final Office Action dated Sep. 21, 2010 in U.S. Appl. No. 11/619,963.
USPTO; Office Action dated Aug. 31, 2010 in U.S. Appl. No. 11/619,971.
USPTO; Notice of Allowance dated Sep. 21, 2010 in U.S. Appl. No. 11/619,971.
USPTO; Office Action dated Aug. 24, 2010 in U.S. Appl. No. 11/619,975.
USPTO; Final Office Action dated Sep. 22, 2010 in U.S. Appl. No. 11/619,975.
USPTO; Office Action dated Sep. 21, 2010 in U.S. Appl. No. 11/619,982.
USPTO; Advisory Action dated Jun. 17, 2010 in U.S. Appl. No. 11/619,982.

* cited by examiner

Model Analysis - Summary Report

Report Date: 10-Mar-2006  605          Variable Name: %BUS%  610

Models which are directly Impacted (parent) 615

| 10193 | 10195 | 10262 | 10311 | 10331 |
|-------|-------|-------|-------|-------|
| 10332 | 10379 | 10439 | 10449 | 10497 |
| 10594 | 10595 | 10596 | 10597 | 10598 |

The Number of Directly Impacted Models is: 15  620

Models which are indirectly Impacted (child) 625

| 10219 | 10225 | 10226 | 10229 | 10246 |
|-------|-------|-------|-------|-------|
| 10247 | 10248 | 10249 | 10250 | 10251 |
| 10252 | 10253 | 10254 | 10255 | 10256 |

Report Date: 10-Mar-2006 1005

| Table | # of variables |
|---|---|
| Basic NACH | 76 |
| Bureau | 399 |
| Spend | 1956 |
| Service | 4069 |
| Customer | 27 |
| Household | 11 |
| Principal Component | 36 |
| Mail | 1313 |
| Optima | 76 |
| CAS | 131 |
| GRMS | 253 |
| APAC | 247 |
| HVCM | 3 |
| Rescore | 154 |
| Total | 8751 |

Select previous weeks report  03/03/2006  View Report
1015  1020

Back

Model Usage Report

| | 1 Month or Less | 2-3 Months | 4-5 Months |
|---|---|---|---|
| On Demand | 4 | 2 | 2 |
| Daily | 0 | 0 | 0 |
| Weekly | 108 | 0 | 0 |
| Monthly | 39 | 0 | 0 |

Figure 15

SYSTEM AND METHOD FOR EVALUATING SIMULATION MODEL PENETRATION

CROSS-REFERENCE TO RELATED APPLICATIONS

This application is a continuation of, and claims priority to, U.S. Ser. No. 11/564,341 filed on Nov. 29, 2006 and entitled "SYSTEM AND METHOD FOR MANAGING SIMULATION MODELS", the entire contents of which is hereby incorporated by reference.

FIELD OF THE INVENTION

The invention generally relates to the management of models, and more particularly, to a system and method for providing empowerment tools, data visualization tools, and impact analysis tools in order to produce reports providing greater insight into model interdependencies, model usage, model distribution, variable usage, model metadata, and system performance.

BACKGROUND OF THE INVENTION

A key characteristic that may be found in every free economy is competition, and therein lies the importance of an effective marketing strategy. Marketing takes many forms and has evolved over the years in terms of form and delivery in direct response to competition and fluid consumer behaviors. Thus, corporations expend great effort and expenditure in developing and modifying effective marketing strategies in light of perpetual changes occurring within the realms of competition, economy, technological advance, political climate, consumer behavior, and/or the like. These are but a few of the variables influencing the success or failure of a marketing strategy.

Marketing is an expensive proposition; however, without it, a business or corporation has little hope of survival, especially in an era of growing consumer options. Ensuring that marketing budgets are directed toward activities that will provide the largest return at the lowest cost is a vital exercise among corporations. Countless books and guides have been published over the years by authors who believe that they possess the magic bullet in marketing strategy. However, it is widely understood that what is effective strategy today, may be a marketing bust tomorrow. Therefore, marketers have adopted various methods to attempt to gauge and forecast the commerce climate, demographic shifts, and behavioral trends.

Computing technologies have increased the marketer's ability to track many marketing related variables and to construct models in order to simulate the outcome of various marketing strategies or campaigns. In addition to the countless proprietary software tools that have been developed internally, a number of software companies have produced a number of "off-the-shelf" solutions that enable a marketer to better develop a sound marketing strategy. These tools are generally built on recognized strategic marketing practices that have been adapted to the current business environment and the tools accept various inputs in order to model marketing scenarios.

Regardless of the modeling tool, the complexities of managing vast libraries of models and model variables can hinder the utilization of models and stretch computing resources. In an environment where multiple users develop models, a transparency is lacking which enables marketers to view the penetration, utilization, and distribution of models. This problem leads to less than efficient and less than effective use of models. Moreover, because models often include interdependencies with other models, clearing out unused, redundant, or outdated models becomes difficult. If a model that appears to not have been used for a period of time is deleted, it may affect other models that were dependent on the deleted model. Thus, there is a need for a system and method for managing models in a transparent environment, wherein marketers may view utilization statistics for models and variables. Further, there is a need for tools to empower marketers to build dynamic queries and generate customized reports on customer behavior and performance. These empowerment tools should include data utilization tools to enable the marketer to zoom in and zoom out of complex model hierarchies and relationships.

SUMMARY OF THE INVENTION

The invention includes a system and method for providing analytic information concerning models and the distribution of model variables to provide a holistic understanding into model relationships and dependencies. The system includes empowerment tools intended to cultivate, share and leverage knowledge, ideas and best practices, accelerate time to develop and deploy models, reduce time to execute campaigns, analyze model usage and trends, monitor data quality and system performance, and diagnostics for these items.

Through a number of interfaces, the invention encompasses model and model variable analysis within three primary groups; model insight, model analysis, and model reports. The system accepts inputs from a user in the form of model and/or variable search or selection criteria, retrieves information relating to models corresponding to the search criteria, and provides a visual representation of model and/or variable attributes within tables or graphs. The user may interact with the system via a web interface to view model dependencies, metadata reports, model analysis summary reports, model analysis detailed reports, model analysis chart reports, model analysis graph report, variable usage by business unit, variable count reports, variable usage by model type, variable metadata reports, model usage, penetration of models in campaigns, types of decision sciences used in customer marketing, human resource allocation, and system performance reports in tabular and graph form.

The system maintains up-to-date information relating to models and model variables within a number of database tables. These tables maintain information relating to models, model summaries, model owners, model dependencies, variables, variable classes, variable types, and/or the like. The system provides a utility to query the various tables in response to a request from a user, format query results according to user preferences or parameters, and provide the data to the requesting user within a web page.

BRIEF DESCRIPTION OF THE DRAWINGS

A more complete understanding of the invention may be derived by referring to the detailed description and claims when considered in connection with the Figures, wherein like reference numbers refer to similar elements throughout the Figures, and:

FIG. 5 is a screenshot of an exemplary interface for entering model search criteria to retrieve a listing of corresponding models, according to an embodiment of the present invention;

FIG. 6 is a screenshot of an exemplary interface for displaying models directly and indirectly impacted by a selected model, according to an embodiment of the present invention;

FIG. 9 is a screenshot of an exemplary interface for displaying model variable usage according to business unit, according to an embodiment of the present invention;

FIG. 10 is a screenshot of an exemplary interface for displaying a detailed variable count report, according to an embodiment of the present invention;

FIG. 11 is a screenshot of an exemplary interface for displaying a variable metadata report, according to an embodiment of the present invention;

Figure 12:
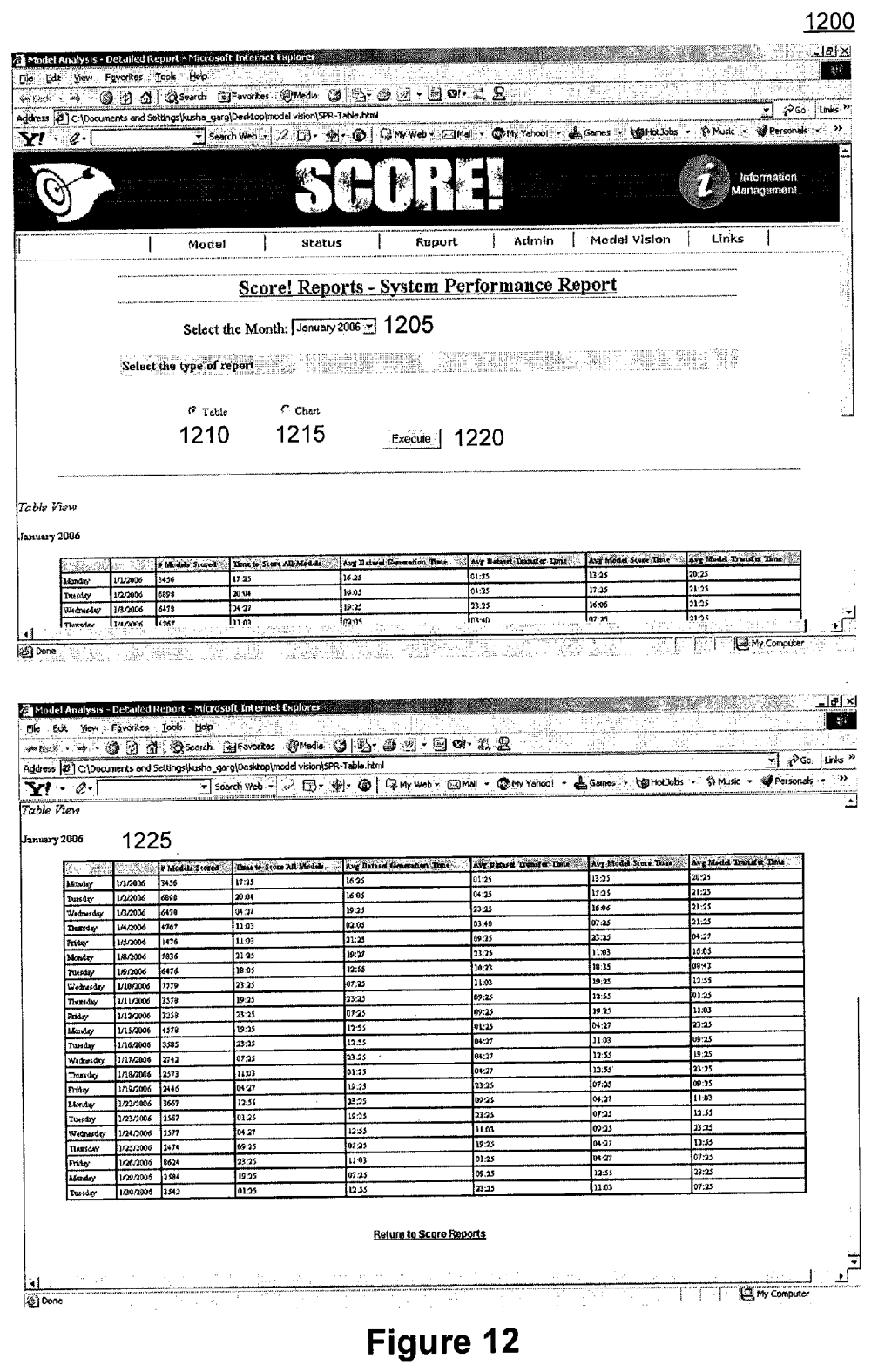

FIG. 12 is a screenshot of an exemplary interface for displaying a system performance report in tabular form, according to an embodiment of the present invention; and, FIG. 13 is a screenshot of an exemplary interface for displaying a system performance report in chart form, according to an embodiment of the present invention;

FIG. 15 is a screenshot of an exemplary interface for displaying a model usage frequency report, according to an embodiment of the present invention; and, FIG. 16 is a screenshot of an exemplary interface for displaying model usage according to penetration and decision sciences, according to an embodiment of the present invention.

DETAILED DESCRIPTION OF EXEMPLARY EMBODIMENTS

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In general, the invention includes a system and method for performing analysis on models and variables within a complex modeling environment. As used herein, "model" or similar terms may include any historic, current or probability data encompassing elements of campaigns, promotions, affiliates, joint promotions, rejections, click-thru, demographics, special offers, earning of loyalty points, redemption of loyalty points, consumer spend, special events, and/or the like. Models and model variables provide a degree of certainty regarding the outcome or effectiveness of campaign scenarios based on, for example, the above mentioned historic data.

Figure 1:
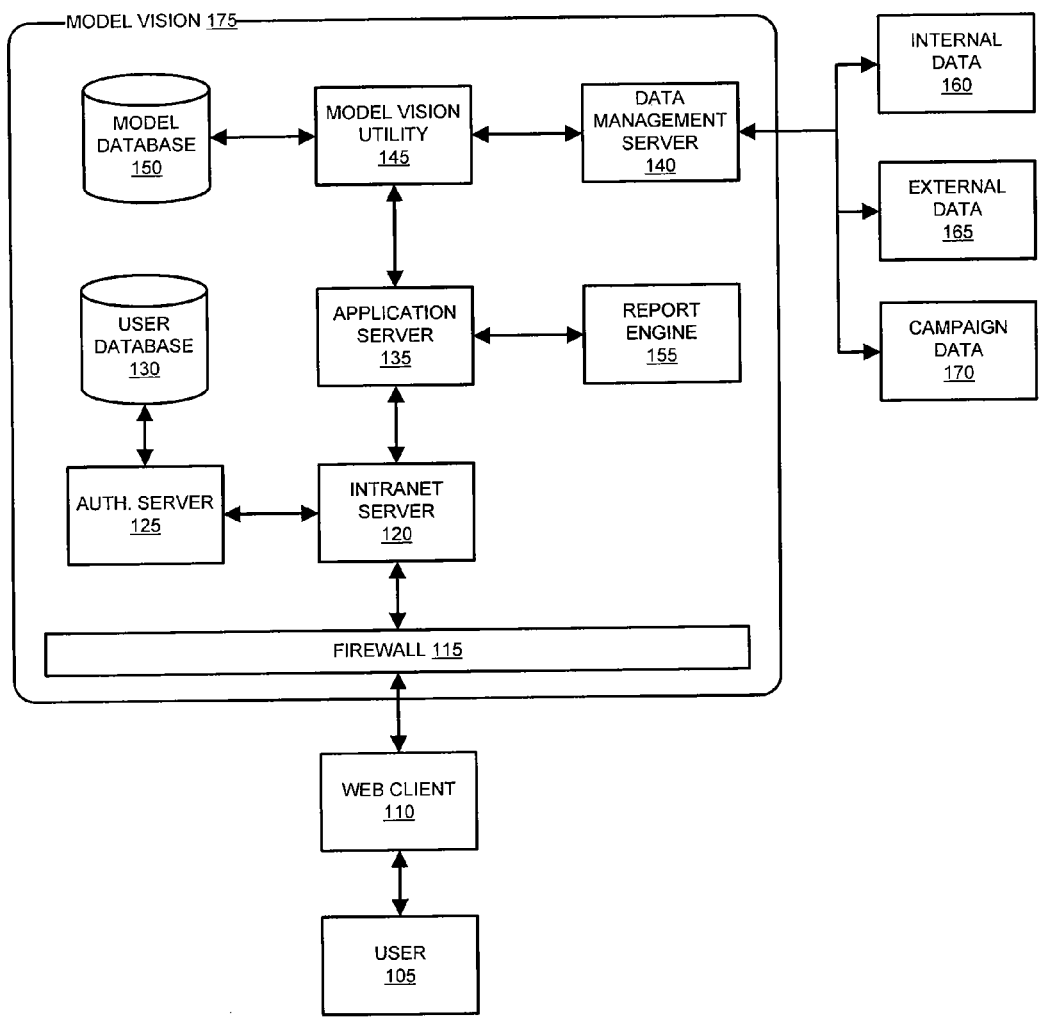
FIG. 1 is a block diagram illustrating the major system components for exemplary tools for providing knowledge and insight into a complex modeling environment, according to an embodiment of the present invention.

With reference to FIG. 1, system 100 facilitates interaction between a user 105 and the Model Vision System (MVS) 175 through, in one embodiment, a web client 110 with a network connection to an intranet server 120. Intranet server 120 may employ an authentication server 125 in order to validate and assign proper permissions to authorized users of MVS 175. User database 130 stores user credentials and permissions specific to each user. Intranet server 120 also employs an applications server 135 to manage various applications and utilities that are utilized by the system. Application server 135 may be a stand-alone server or may comprise software residing within intranet server 120. In one embodiment, Model Vision Utility (MVU) 145 is invoked by application server 135 to query model database 150, retrieve data via data management server 140, and perform complex calculations and data formatting for presentation to user 105 and/or any other designated third-party. Model database 150 maintains data pertaining to models and model variables. Application server 135 also interfaces with a report engine 155 to create preconfigured and/or ad-hoc reports as will be discussed in greater detail herein.

In addition to the components described above, MVS 175 may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: user database 130, model database 150; internal data 160; external data 165; campaign data 170 and/or like data useful in the operation of system 100.

MVS 178 may connect with any number of external systems and databases to acquire data relevant to the modeling environment. Internal data 160, external data 165, and campaign data 170 may be acquired via data management server 140 for use in developing models, business plans, and marketing strategies. Specifically, MVS 178 may use this data in conjunction with the various tools and reports disclosed herein including, for example, analysis of data anomalies, business penetration, model distribution, model usage, variable usage, system performance, human resource allocation, and penetration of decision sciences.

As will be appreciated by one of ordinary skill in the art, one or more of the components of system 100 may be embodied as a customization of an existing system, an add-on product, upgraded software, a stand alone system (e.g., kiosk), a distributed system, a method, a data processing system, a device for data processing, and/or a computer program product. Accordingly, individual system 100 components may take the form of an entirely software embodiment, an entirely hardware embodiment, or an embodiment combining aspects of both software and hardware. Furthermore, individual system 100 components may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The invention contemplates uses in association with web services, utility computing, pervasive and individualized computing, security and identity solutions, autonomic computing, commodity computing, mobility and wireless solutions, open source, biometrics, grid computing and/or mesh computing.

User 105 may include any individual, business, entity, government organization, software and/or hardware that interact with system 100 to view and analyze model relationships and interdependencies, variable interdependencies, model use statistics, and/or the like. User 105 may be, for example, a program manager who interacts with system 100 to determine how models are being utilized by her department for campaigns. User 105 may interface with intranet server 120 via any communication protocol, device or method discussed herein or known in the art. In one embodiment, user 100 may interact with MVS 175 via an Internet browser at a web client 110.

Web client 110 comprises any hardware and/or software suitably configured to facilitate input, receipt and/or review of information relating to models and variables or any information discussed herein. Web client 110 includes any device (e.g., personal computer) which communicates (in any manner discussed herein) with MVS 175 via any network discussed herein. Such browser applications comprise Internet browsing software installed within a computing unit or system to conduct online transactions and/or communications. These computing units or systems may take the form of a computer or set of computers, although other types of computing units or systems may be used, including laptops, notebooks, hand held computers, set-top boxes, workstations, computer-servers, main frame computers, mini-computers, PC servers, pervasive computers, network sets of computers, and/or the like. Practitioners will appreciate that web client 110 may or may not be in direct contact with MVS 175. For example, web client 110 may access the services of MVS 175 through another server, which may have a direct or indirect connection to intranet server 120.

As those skilled in the art will appreciate, web client 110 includes an operating system (e.g., Windows NT, 95/98/2000, OS2, UNIX, Linux, Solaris, MacOS, etc.) as well as various conventional support software and drivers typically associated with computers. Web client 110 may include any suitable personal computer, network computer, workstation, minicomputer, mainframe or the like. Web client 110 can be in a home or business environment with access to a network. In an exemplary embodiment, access is through a network or the Internet through a commercially available web-browser software package.

Web client 110 may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network.

Firewall 115, as used herein, may comprise any hardware and/or software suitably configured to protect MVS 175 components from users of other networks. Firewall 115 may reside in varying configurations including stateful inspection, proxy based and packet filtering among others. Firewall 115 may be integrated as software within intranet server 120, any other system components or may reside within another computing device or may take the form of a standalone hardware component.

Intranet server 120 may include any hardware and/or software suitably configured to facilitate communications between web client 110 and one or more MVS 175 components. Further, intranet server 120 may be configured to transmit data to web client 110 within markup language documents. As used herein, "data" may include encompassing information such as commands, queries, files, data for storage, and/or the like in digital or any other form. Intranet server 120 may operate as a single entity in a single geographic location or as separate computing components located together or in separate geographic locations.

Intranet server 120 may provide a suitable web site or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system.

Any of the communications, inputs, storage, databases or displays discussed herein may be facilitated through a web site having web pages. The term "web page" as it is used herein is not meant to limit the type of documents and applications that might be used to interact with the user. For example, a typical web site might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and/or the like. A server may include a web service that receives a request from a web server, the request including a URL (http://yahoo.com/stockquotes/ge) and an IP address (123.56.789). The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Application server 135 may include any hardware and/or software suitably configured to serve applications and/or data to a connected web client 110. Like intranet server 120, application server 135 may communicate with any number of other servers, databases and/or components through any means known in the art. Further, application server 135 may serve as a conduit between web client 110 and the various systems and components of the MVS 175. Intranet server 120 may interface with application server 135 through any means known in the art including a LAN/WAN, for example. Application server 135 may further invoke MVU 145, data management server 140, and/or report engine 165 in response to user 105 requests.

MVU 145 may include any hardware and/or software suitably configured to receive requests from web client 110 via intranet server 120 and/or application server 135. MVU 145 is further configured to process requests, construct database queries, and execute queries against model database 150. MVU 145 receives data from model database 150, formats the data, and passes the data to intranet server 120 via application server 135. Application server 135 constructs a markup language document based on the data and transmits the document to web client 110 for display within a browser application. In one embodiment, MVU 145 may be configured to interact with other MVS 175 components to perform complex calculations, retrieve additional data, format data into reports, create XML representations of data, construct markup language documents, and/or the like. Moreover, MVU 145 may reside as a standalone system or may be incorporated with application server or any other MVS 175 component as program code.

Data management server 140 may include any hardware and/or software suitably configured to facilitate communications between MVU 145 and one or more data sources. Specifically, the data management server 140 may include a middleware product to facilitate communication with varying types of databases residing on disparate hosts. Data may be collected from an internal source 160, and external source 165, as well as data specific to one or more marketing campaigns 170. This data may serve as inputs to the modeling process to determine the probable outcome of marketing activity. Moreover, MVU 145 may utilize this data in determining the effectiveness of models or in diagnostics to determine if model output is consistent with results from real-world campaign.

Report engine 155 may include any hardware and/or software suitably configured to produce reports from information stored in one or more databases. Report engines are commercially available and known in the art. Report engine 155 may provide printed reports, web access to reports, graphs, real-time information, raw data, batch information and/or the like.

Report engine 155 may be implemented through commercially available hardware and/or software, through custom hardware and/or software components, or through a combination thereof. Further, report engine 155 may reside as a standalone system within MVS 175 or as a component of application server 135 or intranet server 120.

In order to control access to application server 135 or any other component of MVS 175, intranet server 120 may invoke an authentication server 125 in response to user 105 submissions of authentication credentials received at intranet server 120. Authentication server 125 may include any hardware and/or software suitably configured to receive authentication credentials, encrypt and decrypt credentials, authenticate credentials, and grant access rights according to pre-defined privileges attached to the credentials. Authentication server 125 may grant varying degrees of application and data level access to users based on information stored within user database 130. For example, a system administrator may be granted access to input and/or modify models and variables, while a marketing manager may be limited to model and variable analysis only.

User database 130 may include any hardware and/or software suitably configured to facilitate storing identification, authentication credentials, and user permissions. Model database 150 stores data relating models and model variables. One skilled in the art will appreciate that system 100 may employ any number of databases in any number of configurations. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of system 100, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with system 90 by multiple and unrelated owners of the data sets.

For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of system 90, the data can be stored without regard to a common format. However, in one exemplary embodiment of the invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand-alone device, the appropriate option for the action to be taken. System 100 contemplates a data storage arrangement wherein the header or trailer, or header or trailer history, of the data is stored on the transaction instrument in relation to the appropriate data.

One skilled in the art will also appreciate that, for security reasons, any databases, systems, devices, servers or other components of system 100 may consist of any combination thereof at a single location or at multiple locations, wherein each database or system includes any of various suitable security features, such as firewalls, access codes, encryption, decryption, compression, decompression, and/or the like.

The invention may be described herein in terms of functional block components, screen shots, optional selections and various processing steps. It should be appreciated that such functional blocks may be realized by any number of hardware and/or software components configured to perform the specified functions. For example, system 100 may employ various integrated circuit components, e.g., memory elements, processing elements, logic elements, look-up tables, and/or the like, which may carry out a variety of functions under the control of one or more microprocessors or other control devices. Similarly, the software elements of system 90 may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that system 90 may employ any number of conventional techniques for data transmission, signaling, data processing, network control, and/or the like. Still further, system 90 could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Practitioners will appreciate that there are a number of methods for displaying data within a browser-based document. Data may be represented as standard text or within a fixed list, scrollable list, drop-down list, editable text field, fixed text field, pop-up window, and/or the like. Likewise, there are a number of methods available for modifying data in a web page such as, for example, free text entry using a keyboard, selection of menu items, check boxes, option boxes, and/or the like.

Figure 2:
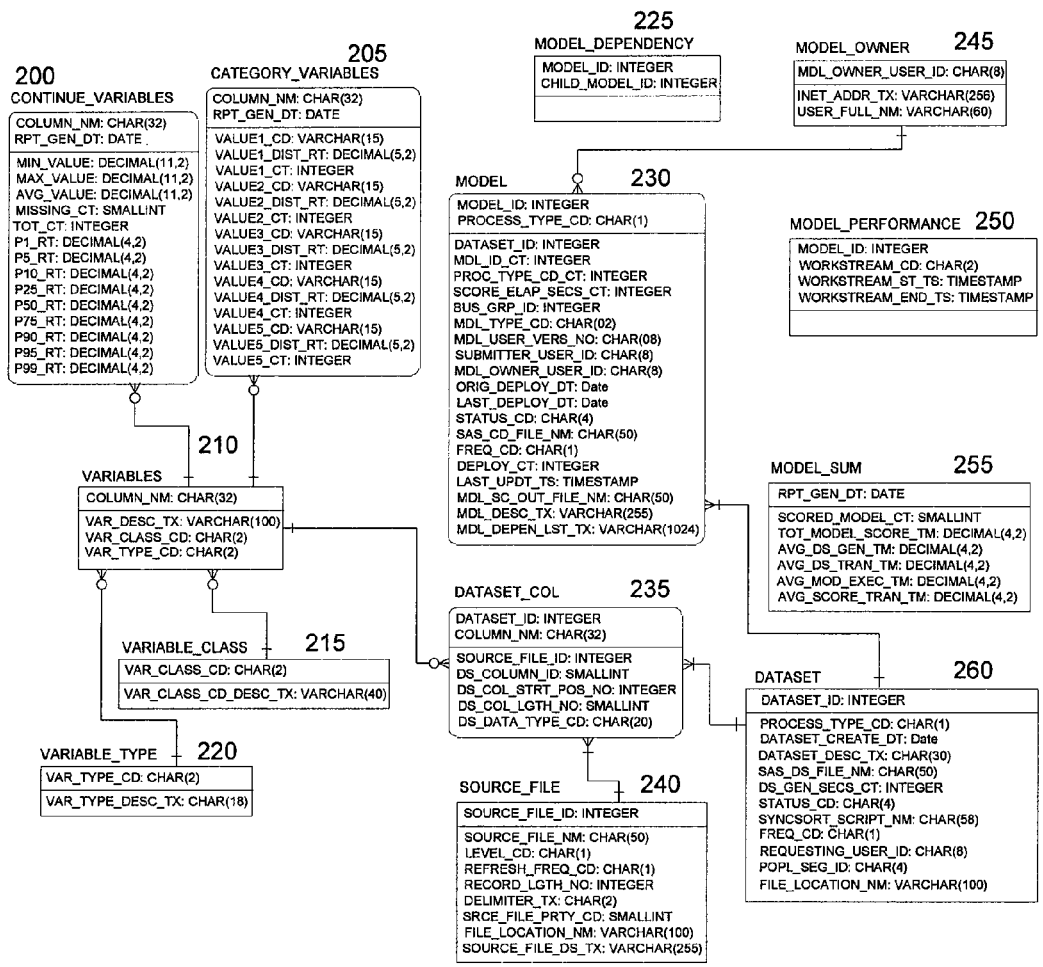
FIG. 2 is a data diagram showing tables and table relationships for exemplary tools for providing knowledge and insight into a complex modeling environment, according to an embodiment of the present invention.

Referring to FIG. 2, an exemplary data diagram is shown for managing models and model variables within a complex modeling architecture. In one embodiment, the data diagram includes Continue_Variables 200, Category_Variables 205, Variables 210, Variable_Class 215, Variable_Type 220, Model_Dependency 225, Model 230, Dataset_Col 235, Source_File 240, Model_Owner 245, Model_Performance 250, Model_Sum 255 and Dataset 260. The tables, fields, key fields, and table relationships are presented for explanation only and are not intended to limit the scope of the invention. Practitioners will appreciate that a relational database may be arranged in any number of ways without significantly altering the storage, modification, retrieval, and deletion of data from the perspective of a front-end computer application. In other words, any of the illustrated tables may be divided into two or more tables. Likewise any two or more tables may be combined into one table.

The screenshots of FIGS. 3-13 are merely embodiments of interfaces to system 100 and are not intended to limit the scope of the invention as described herein. For example, the steps recited in any of the method or process descriptions may be executed in any order and are not limited to the order presented. It will be appreciated that the following description makes appropriate references not only to the elements depicted in FIGS. 3-13, but also to the various system components as described above with reference to FIG. 1 and the data diagram of FIG. 2.

As disclosed herein, system 100 provides users with a number of views into a model environment to assist in the design, management, utilization, and distribution of models and model variables. In one embodiment, the various views are categorized into three primary knowledge areas; Model Insight, Model Analysis, and Model Reports. Thus, user 105 accessing system 100 via web client 110 is first presented a Model Vision home page that may include any number of links and other information. The Model Vision home page specifically includes a menu with links to each of the primary knowledge areas. Furthermore, the Model Vision home page may include direct links to each view within each of the three primary knowledge areas.

Figure 3:
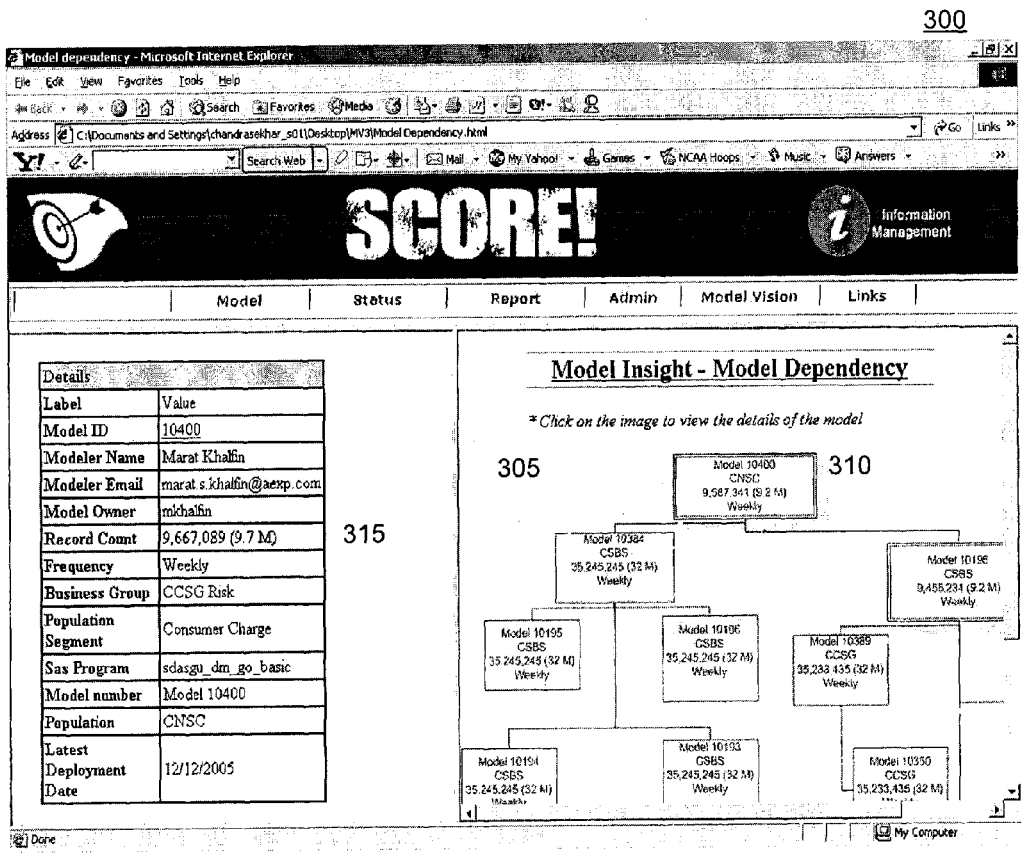
FIG. 3 is a screenshot of an exemplary interface for displaying model relationships and model variables, according to an embodiment of the present invention.

FIG. 3 is a screenshot of an exemplary interface for displaying model relationships and model variables in accordance with an embodiment of the present invention. When an authorized user connects with MVS 175 via web client 110, the user is presented with the Model Vision home page that includes links to three primary model knowledge areas. Practitioners will appreciate that the links may comprise hyperlinks, dropdown menus, check boxes, and/or the like. From the Model Vision home page, user 105 may select a link to access a Model Insight home page. From the Model Insight home page, user 105 is presented with options to view model dependencies or model metadata. Both model dependency and model metadata options may comprise dropdown menus that are pre-populated with a list of model identifiers retrieved from the Model table 230. On selecting a model identifier in the model dependency dropdown menu, the model identifier is transmitted from web client 110 to intranet server 120 via a request. Intranet server 120 verifies that the request is from an active session, or whether authentication credentials are required of the user. Practitioners will appreciate that system 100 may use any known method for maintaining state in a web environment, including through the use of cookies, hidden form fields, Active Server pages (ASP), Java Server pages (JSP), and/or the like.

Intranet server 120 passes the request to application server 135, which invokes MVU 145 to format the request, construct a SQL query, establish a connection with model database 150, pass the SQL query to model database 150, receive query results, format the results, and pass the formatted results to intranet server 120 via application server 135. Intranet server 120 compiles the results into a hypertext language document and transmits the document to web client 110 where it is displayed as a web page within a web browser. Furthermore, MVU 145 or application server 135 may invoke report engine 155 to format results before passing the results to internet server 120.

The Model Dependency web page 300 includes a chart that graphically represents the selected model as the parent model in a dependency tree 305. Branching from the parent model 310 are all models that are directly or indirectly dependent on the parent 310. As the Model Dependency web page 300 is loaded at web client 110, MVU 145 queries model database 150 based on the parent model identifier and retrieves all records from Model_Dependency table 225 corresponding to the parent model 310. The dependency tree 305 is sequentially constructed based on a series of queries spawned from the retrieval of model identifiers that are dependent on the parent model. For example, a query on model identifier "10400" returns two dependent models; "10384" and "10196". MVU 145 then issues queries to retrieve model identifiers for models that are dependent on models "10384" and "10196." This process may continue until no further model dependencies are found. From this data, the model dependency tree is constructed through any number of known methods for constructing a data tree.

In addition to the model identifier, information further defining the models in the dependency tree 305 may be displayed providing user 105 with a quick overview of the general attributes of the models. For example, the models may be displayed along with a business unit identifier, creation date, frequency of use, record count, and/or the like. Each model in the tree structure further includes a hyperlink that, when selected, invokes MVU 145 to issue a query against the Model table 230 to retrieve metadata information. The metadata information is formatted and presented in tabular form on a portion of the web page as a mini-metadata report 315. Information included in the mini-metadata report may include, for example, model label, model identifier, name of the modeler, email address for the modeler, model owner, number of records associated with the model, frequency of use, business group, population segment, model program environment, population, and most recent deployment date. The model identifier in the mini-metadata report is hyperlinked to a detailed metadata report web page, which will be discussed in greater detail in reference to FIG. 4. In another embodiment, model metadata for both parent and child models are returned with the tree structure and are maintained within the hypertext language document, thereby eliminating the need for MVU 145 to issue a new query every time user 105 clicks on a different model in the tree structure.

Model Dependency web page 300 further includes navigation and view controls to enable user 105 to zoom in or out of the dependency tree 305. This may be desirable as model dependencies can become very large and complex. A search utility may further provide user 105 the ability to quickly locate specific models within a complex dependency tree 305. Preferences may be defined by user 105 to control the appearance and behavior of the Model Dependency web page 300. Such preferences may include, for example, display colors, information to display within models, navigation, sizing, zooming, and/or the like.

In one embodiment, each model displayed within the tree structure includes an expand/retract hyperlink enabling user 105 to control which levels of the dependencies to view. For example, if a parent model has two child models and six grandchild models branching from the child models, user 105 may select a link on one or both of the child models to hide or show the grandchild models.

In another embodiment, the models in the tree structure are color coded. Varying colors are used to indicate that a model has been marked for deletion, has not been used for a defined period of time, is a new model, and/or the like. Furthermore, models may be color coded according to model label, model identifier, modeler, model owner, number of records associated with the model, frequency of use, business group, population segment, model program environment, population, and most recent deployment date.

To view detailed metadata information relating to a selected model, user 105 may select the hyperlinked model identifier field in the mini metadata report 315. A metadata report web page may also be accessed from the Model Insight home page. As previously described, both model dependency and model metadata options may comprise dropdown menus that are pre-populated with a list of model identifiers that are retrieved from the Model table 230. After selecting a model identifier in the model metadata dropdown, user 105 is presented with a Metadata Report web page.

In addition to the various view controls discussed above in reference to FIG. 3, the invention contemplates the incorporation of other capabilities to expand the user's ability to manage a complex modeling environment in view of the perspectives gained by the various insight and reporting tools disclosed herein. A brief description of these various capabilities is hereby disclosed. Practitioners will appreciate that for the sake of brevity, the incorporation of the herein disclosed capabilities will not be repeated with each of the described interfaces presented in FIGS. 3 through 16.

The disclosed interfaces may incorporate color coding in a manner similar to that which is disclosed above in reference to FIG. 3. Color coding or any other visual modification of interface elements may be helpful in helping user 105 to more quickly and accurately discern variations in values, properties, status, and the like. Moreover, visual variations may be incorporated to draw the attention of user 105 to critical elements where closer analysis may be helpful or essential. For example, if a model appearing in the dependency tree described above is slated for decommissioning, it may be beneficial to highlight the corresponding model node to enable user 105 to quickly determine whether the decommissioning status will have an effect on decisioning efforts.

Display preferences, also discussed above, may include any configurable properties relating to the manner in which various interface elements are displayed. As will be described in greater detail herein, such display preferences may define whether data is presented in tabular form or within a graph. Display preferences may further enable a user to configure a color scheme for the visual variations described above. For example, user 105 may configure MVS 175 to display all models that have not been used over the past ninety days in yellow. Display preferences may further include magnification, scrolling, report delivery preferences, audio alerts, visual alerts, and the like.

When appropriate, the herein disclosed interfaces may include various configurations of search tools. Such search tools may be provided with the bounds of the interface, on a separate web page, within a dialog box, as a popup, and the like. Search tools enable user 105 to enter criteria specific to the information that the user 105 is most interested in reviewing. In some cases, this may include very specific criteria such as a model name, for instance. Under other scenarios, the search criteria may be less rigid such as, for example, to retrieve all variables developed by an identified model developer. Practitioners will appreciate that there are a number of ways in which data can be searched within a database including via multiple parameters, Boolean, wildcard, and/or the like.

A number of reports and reporting interfaces are disclosed herein. Reports may further be ordered for delivery to a printer, or to any number of email recipients. The various interfaces may enable user 105 to designate a reporting group (i.e., who is to receive a report), a delivery mechanism (e.g., email, facsimile, printer, PDA device, cellular telephone), and define a reoccurring reporting schedule (e.g., annual, monthly, weekly, daily). For example, user 105 may select a link on the Model Analysis Detailed Report interface (FIG. 7) to setup a reoccurring report. An interface is provided whereby user 105 may select an option to have MVS 175 run the report on the last day of each month, select from a list of authorized users to whom the report is to be delivered, and select the delivery mechanism.

In one embodiment, an email may be generated for delivery to any number of individuals or mailing groups. The email message may contain a link wherein, selection of the link automatically opens a browser application, retrieves a saved report, and provides the report within the appropriate interface. In another embodiment, the report may be included within the body of the email message itself.

Notation tools provide for increased cohesion between individuals working independently within a modeling environment. For example, a model metadata report may enable user 105 to enter a notation and attach it to a specific variable or metadata element in order to subsequently alert other users that models relying on the specific variable have produced erroneous data. Moreover, entry of a notation may invoke an automatic generation of an email message that will be delivered to any number of identified users. Such identified users may include, for example, managers, model developers, marketing personnel, and the like.

While the various interfaces are described herein in terms of analysis and reporting tools, the invention further contemplates that user 105 may interact with any of the interfaces to enter, modify, and/or delete data relating to metadata, variables, and models. Various levels of editing may be permitted according to user privileges that have been defined and stored at user database 130. For example, only an administrator may be permitted to delete a variable, but a developer may be permitted to modify metadata. Such modifications may further be subject to authorization by any one or more defined users. For example, an administrator may select a variable in a model metadata report to delete, however, the deletion will not occur until the model owner and developer have been notified and authorize the deletion. According to this embodiment, the invention further contemplates a workflow manager to ensure adherence to organizational policies and to safeguard a modeling environment against the erroneous modifications of any single user.

Similar to the editing abilities described above, the system may also provide decommissioning tools. When it is determined that a model or variable have become obsolete, are no longer used, or provide inaccurate output, it may be desirable to remove it from the modeling environment. However, as will be discussed in greater detail herein, removing a model may have far reaching consequences due to interdependencies among models and model variables. Thus, when analysis proves that a model should be decommissioned, the system may control the processes, such that the appropriate personnel are notified and that appropriate authorizations are obtained. MVS 175 further incorporates intelligence tools that prevent the removal of models and variables when it is determined that such removal will compromise the integrity of the modeling environment. MVS 175 may only permit the removal when issues of dependencies are resolved or on authorization from a super user.

Figure 4:
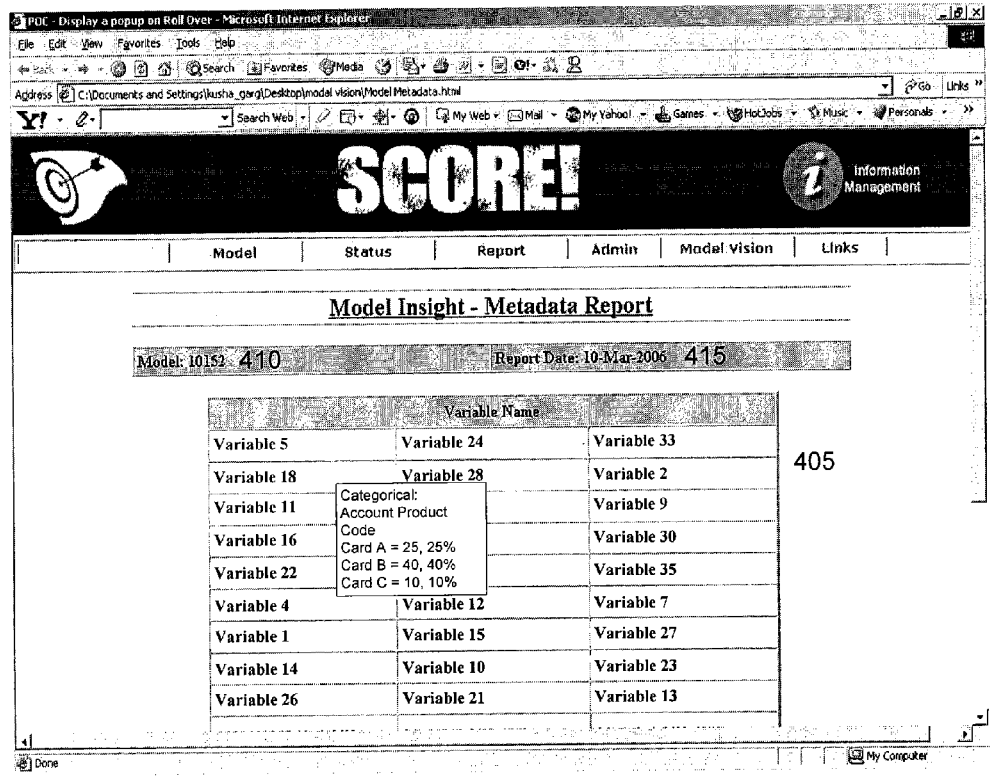
FIG. 4 is a screenshot of an exemplary interface for displaying model metadata and variable values, according to an embodiment of the present invention.

FIG. 4 is a screenshot of an exemplary web page for displaying a detailed report of metadata related to model variables. The report includes a list of variables such that when the user selects (e.g., mouse over event, clicks, etc) a variable, current score values relevant to that variable are displayed. As the Metadata Report web page 400 is loading at web client 110, MVU 145 executes a query against the Dataset Col _ table 235 with a join request to the Model table 230 to retrieve a list of variables associated with the selected model. Variables are listed by name in tabular form (in Variable Name chart 405) following a header portion displaying the model identifier 410 and report date 415. A field displaying the total number of variables may also be displayed within the Metadata Report web page 400.

User 105 may view complete details for any of the listed variables by placing a mouse cursor over a variable name. MVU 145 obtains variable details by first issuing a query against the Variables table 210 to determine the variable type. In one embodiment, variables are categorized among two types; "Continuous" or "Categorical."

Continuous variables are infinite and statistically defined as interval and ratio numerical values. Statistical values (univariate data) for continuous variables may include, for example, min, max, mean, missing, count, range, sum, p1, p5, p10, etc. In one embodiment, MVS 175 organizes and displays continuous variables within a histogram. Categorical variables are statistically defined as nominal and ordinal values. Categorical variables are alpha-numeric values that, according to one embodiment, are organized and displayed as a pie chart. Statistics calculated for categorical variables are top 5 attributes in percentage and absolute terms.

From the Variables table 210, MVU 145 determines the value of the "var_type cd" field. If the value is equal to "CH" (Char) or "DT" (Date), then the variable is "categorical." If the "var_type_cd" field value is equal to "EN" (Numeric) or "MD" (Model's score variable), then the variable is "continuous."

The variable type determines which table to query to retrieve variable details. If the variable is determined to be of type "Categorical", then MVU 145 queries the Category_Variables table 205, otherwise the query is directed to the Continue_Variables table 200. The variable details are retrieved based on the most recent report generation date as recorded in "Rpt_Gen_Date" fields in either the Category_Variables table 205 or the Continue_Variables table 200.

Figure 5:
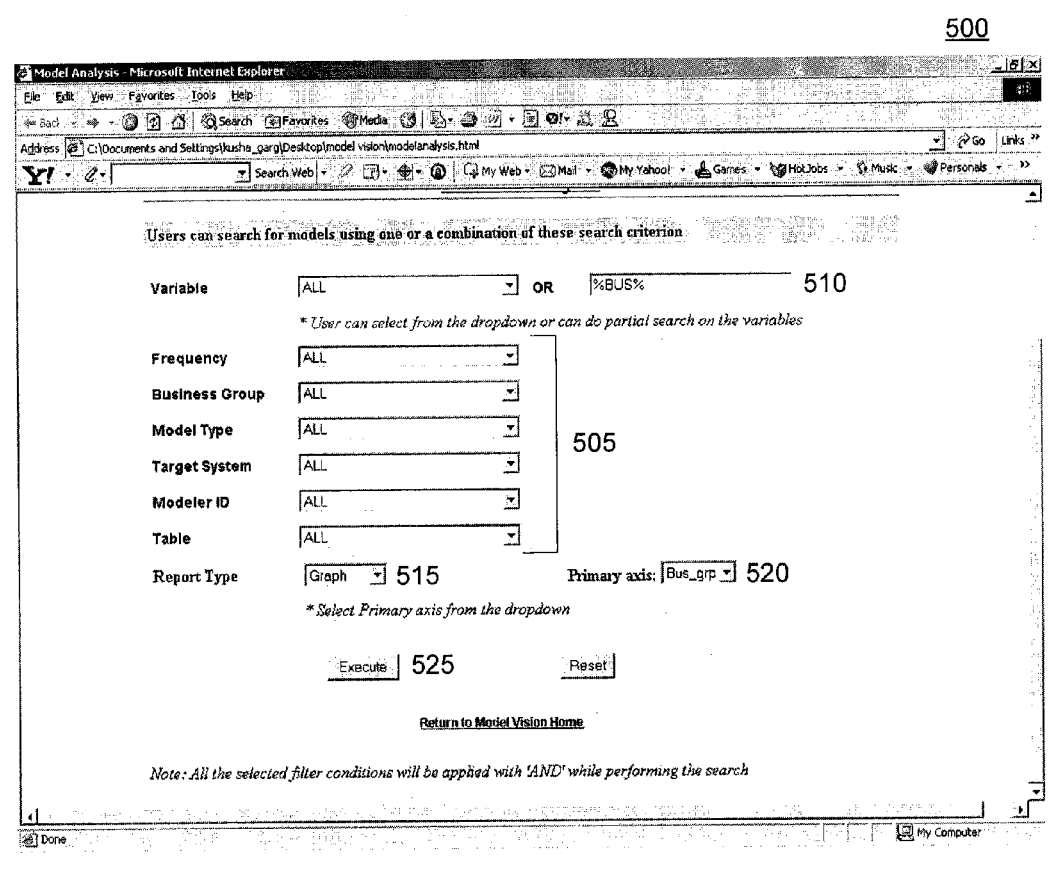

To aid in the analysis of a model and its distribution in light of various conditions, user 105 may select a link from the home page to view a Model Analysis web page. Referring to FIG. 5, the Model Analysis web page 500 includes a number of model selection parameters presented in dropdown menus 505. Such model selection parameters may include, for example, variable identifier 510, frequency of use, business group, model type, target system, modeler identifier, table name, and/or the like. Thus, if user 105 would like to perform an analysis on a specific group of models, she may select any number of criteria to narrow the retrieval to those models that she is most interested in viewing. Moreover, user 105 may retrieve models according to text entry of a variable name or partial variable name entered in a text search field 510.

User 105 may select a report type 515 and the primary axis 520 from corresponding dropdown menus. Practitioners will appreciate that system 100 may incorporate any number of presentations to represent model distribution and model use within a report. For example, user 105 may select to view a selection of models in a pie chart, which provides a simple representation of model distribution in a comparative manner. User 105 may further choose to view reports at varying levels of detail including, for example, a summary report and a detailed report. The selection of the primary axis 520 defines the presentation of a graph, in that the retrieved models will be segregated according to the primary axis selection.

For example, if a variable relates to the interest rate for a financial product, a user may increase this variable, then determine how such an increase will affect the various models that are impacted by the variable. More specifically, if the interest rate is raised from 5% to 10%, then the user may see that a model which models financial product purchases in the southeastern United States shows a decrease in the number of expected financial product purchases to decrease due to consumers historically not desiring a financial product with such a high rate.

To submit the selected parameters, report type, and primary axis to MVS 175, user 105 selects an "Execute" link 525. The selected parameters, report type, and primary axis are submitted and processed by MVS 175 in a manner similar to that described above in reference to FIG. 3. The selected parameters are used to query model database 150 and retrieve data corresponding to the selection parameters. The retrieved model data is formatted according to the report type 515 and primary axis 520 selections within a hypertext language document and is transmitted to web client 110 for review by user 105.

FIG. 6 is a model summary report that includes a report date 605 and variable name 610. Displayed in tabular form, the report lists all (or any subset of) models which are directly impacted (in chart 615) by the selected variable identified at 610. User 105 may further view the number of models directly affected by the selected model 620. A second table displays models that are indirectly impacted by the selected variable as identified at 610. In other words, table 625 lists models that are directly impacted by the selected variable. Information regarding model dependencies is retrieved by MVU 145 based on a query executed against the Model_Dependency table. While not illustrated, Summary Report 600 web page includes a sum of models that are indirectly impacted by the variable identified at 610. Also not shown, the Summary Report web page 600 includes a display of the search parameters which formed the basis of the present report.

The model identifiers for both directly and indirectly impacted models include hyperlinks which link to the Model Dependency web page described in reference to FIG. 3. The selection of any of the displayed model identifiers invokes MVU 145 to construct a tree structure representative of the variable dependencies in the manner described above. Selection of a model identifier from the Summary Report web page 600 causes the Model Dependency web page to open in a new window, thus preserving the content of Summary Report web page 600 while allowing user 105 to drill in and view one or more model dependencies in the tree structure.

Figure 7:
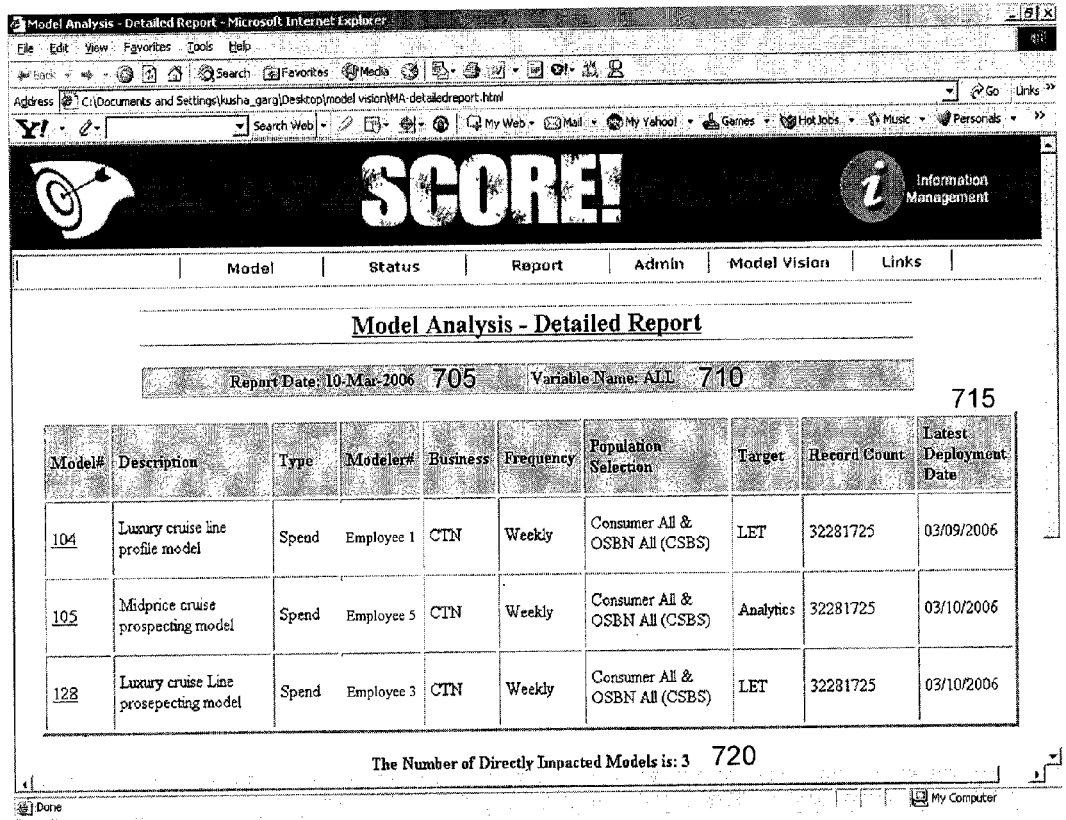
FIG. 7 is a screenshot of an exemplary interface for displaying detailed model attributes, according to an embodiment of the present invention.

FIG. 7 is a screenshot of an exemplary interface for displaying detailed model attributes in accordance with an embodiment of the present invention. For a more holistic view of model details, user 105 may select to view a Detailed Report web page 700 that presents models with sufficient detail to enable user 105 to quickly discern model attributes. In one embodiment, only models that are directly impacted by the selected variable are displayed within the Detailed Report web page 700. The total number of directly impacted modules may also be shown at 720. However, practitioners will appreciate that a detailed display of indirectly impacted models may provide additional benefits. When the Detailed Report web page 700 is constructed, the report date 705 is recorded and the variable name 710 from which the displayed models depend is listed. Model details are displayed in tabular form 715 and include columns to display, for example, model identifier, model description, type, modeler identifier, business unit, frequency, population selection, target, record count, latest deployment date, and/or any other information that can be captured from the Model table 230 or related table. While not shown, the Detailed Report web page 700 includes a display of the search parameters which formed the basis of the present report.

The model identifiers for the listed models 715 include hyperlinks which link to the Model Dependency web page described in reference to FIG. 3. The selection of any of the displayed model identifiers invokes MVU 145 to construct a tree structure representative of the variable dependencies in the manner described above. Selection of a model identifier from the Detailed Report web page 700 may cause the Model Dependency web page to open in a new window, thus preserving the content of the Detailed Report web page 700, while allowing user 105 to drill in and view one or more models dependencies in the tree structure.

Figure 8:
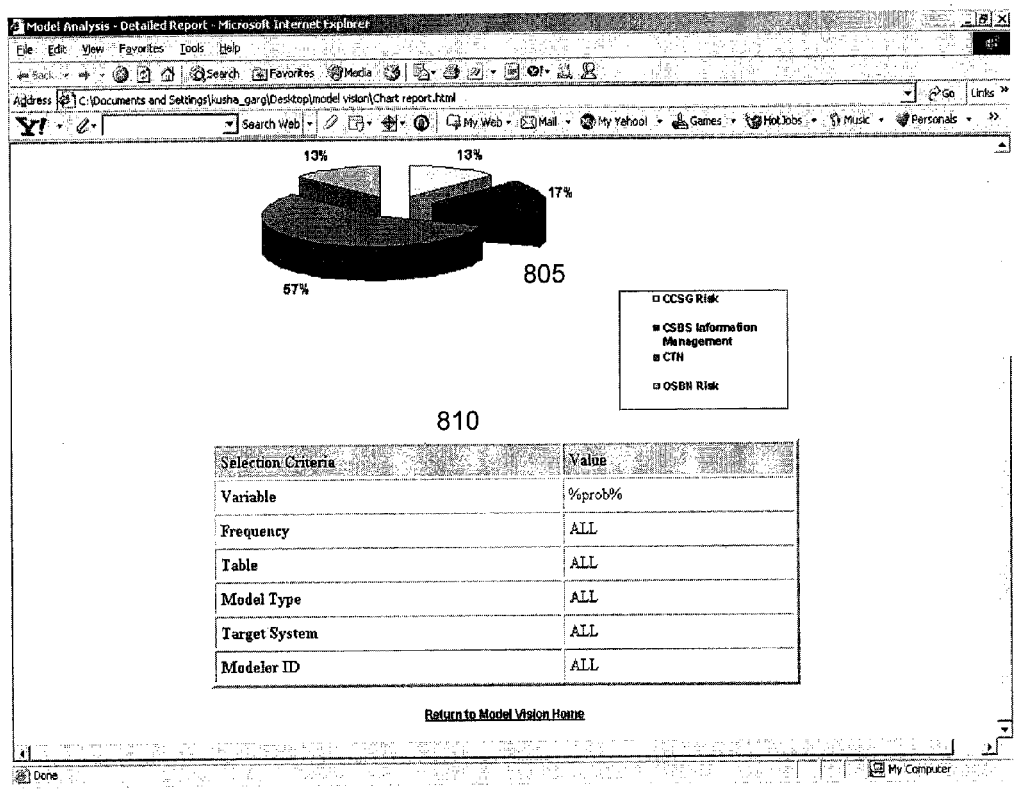
FIG. 8 is a screenshot of an exemplary interface for displaying a chart showing the distribution of selected models, according to an embodiment of the present invention.

With reference to FIG. 8, a Chart Reports web page 800 provides user 105 with a graphical representation 805 of model distribution based on the primary axis 520 that user 105 selected at the Model Analysis web page. As the Chart Report web page 800 is loaded, MVU 145 executes a query against the Model table 230 according to the search criteria selected at the Model Analysis web page. Results are grouped according to the selected primary axis and formatted into a graph 810 to be incorporated within the Chart Reports web page 800. Practitioners will appreciate that there are a number of commercially available charting utilities that accept data in addition to parameters to construct a graphical representation of the data for incorporation within a web page. Moreover, report engine 155 may be invoked by application server 135 to construct a graph of varying types. One such report engine is Crystal Reports® by BusinessObjects™. Crystal Reports enables developers to quickly configure and incorporate sophisticated reports and graphs within custom computer applications and web pages.

System 100 provides various other reporting capabilities in addition to the analysis of models as described above. Specifically, system 100 enables user 105 to view reports reflecting variable usage by business unit, variable usage by model type, variable metadata, and system performance. Such reports provide user 105 with greater insight into the actual usage of models and model variables and system performance as it relates to modeling procedures, as opposed to the analysis of model distribution and dependencies, as described above. Practitioners will appreciate that the report types disclosed herein may represent only a sampling of report types that may be provided to users of system 100.

From the Model Vision home page, user 105 may select a link to view the Model Reports home page. The Model Reports home page further provides links to other web pages providing specific reporting capabilities, which are described in greater detail herein. Practitioners will appreciate that the links may be presented in the form of hyperlinks, dropdown menus, check boxes, and/or the like.

Figure 9:
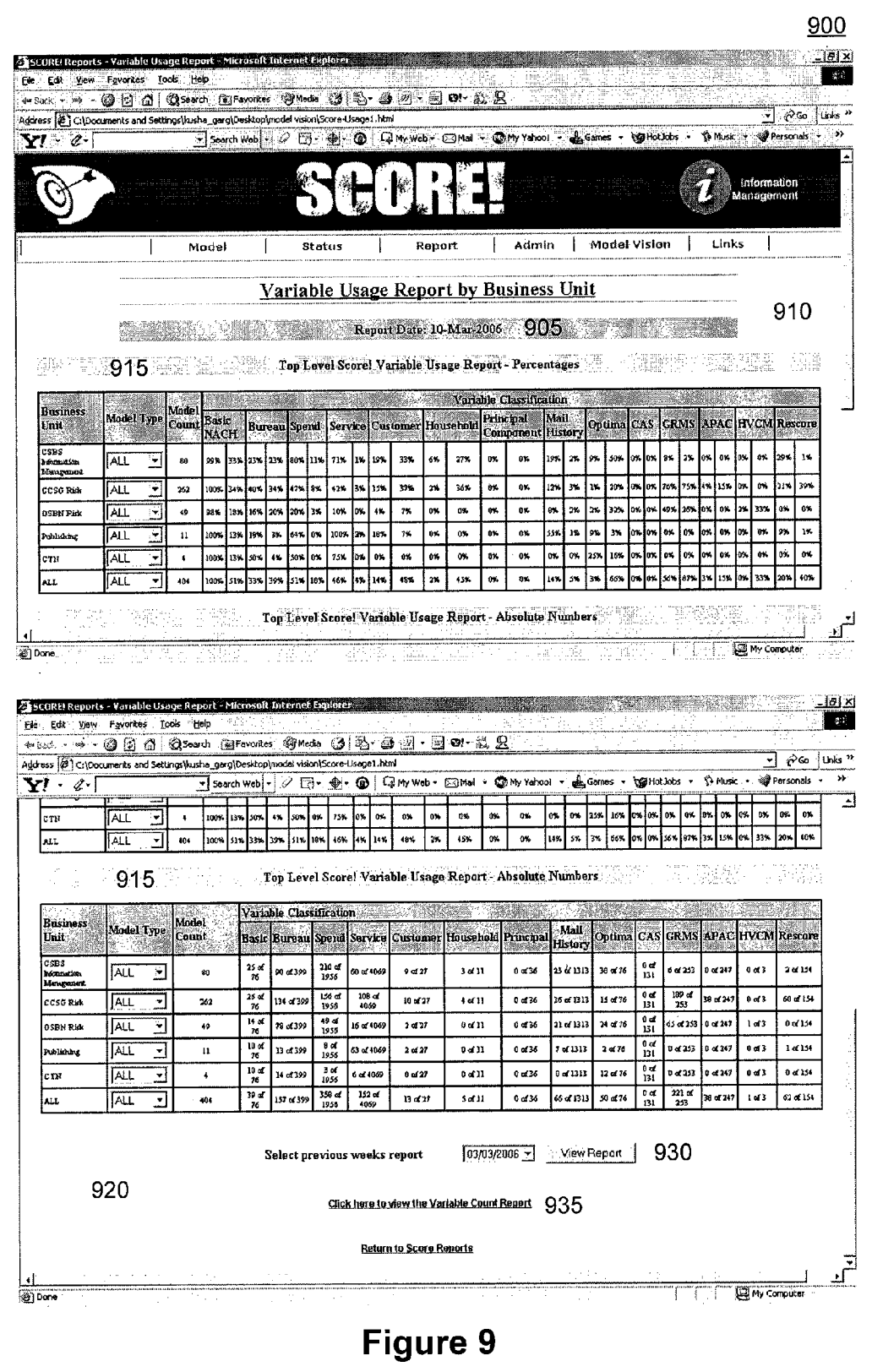

Referring to FIG. 9, after selecting a link to view variable usage by business unit, MVU 145 executes a query against Model table 230 to retrieve and categorize variable data according to business unit. The categorized variable data is displayed in tabular form within the Variable Usage by Business Unit web page 900 and includes a first table 910 displaying variable usage data by percentage and a second table 920 displaying variable usage data by absolute numbers.

Each of first table 910 and second table 920 include a row for each business unit. Each business unit row includes a Model Type dropdown menu 915 populated with distinct values available from the Mdl_Type_CD field of the Model table 230. Each of first table 910 and second table 920 further include columns representing the model count per business unit and a series of variable classification columns to display the distribution of the variables among each classification. When a value is selected from a Model Type dropdown menu 915, the number of models dependent on the combination of variables is updated in the Model Count column. Further, the percentage/absolute number distribution of the variables corresponding to the combination of business unit and selected Model Type 915 are displayed within that row.

The column representing variable classification in first table 910 is subdivided. A first subdivision represents a percentage of models that uses at least one variable of that variable type. A second subdivision represents a percentile value indicating the percentage of variables of that type, which are used in at least one model.

The Variable Usage by Business Unit web page 900 further includes a date selection dropdown menu 930 to enable user 105 to select previously generated reports. When a variable usage report is executed, MVS 175 may automatically save the report to an archive table within model database 150. In another embodiment, MVS 175 may be configured to run the report at regular intervals (i.e., monthly). Thus, when user 105 desires to view a previous report, she may select a report date from the date selection dropdown menu 930, invoking MVU 145 to execute a query against an archive table to retrieve data representative of the state of variable usage for the selected report date. This may be useful, for example, in determining how changes to models or variables have affected variable usage over time.

To view a report containing the sum of variables under each variable classification, user 105 may select a link 935 to launch the report in a new window. Referring to FIG. 10, the Variable Count Report web page 1000 includes a report date 1005 and a table 1010 comprising a column for variable classification and a column displaying the number of variables. Each row of the table represents a variable classification and a corresponding number of variables presently falling within the variable classification. User 105 may further view previous reports by selecting a report date from a date selection dropdown menu 1015. When user 105 selects a "View Report" link 1020, MVU 145 executes a query against an archive table to retrieve data representative of the state of variable counts for the selected report date. This information may be obtained from the archived Variable Usage by Business Unit records.

Similar to the Variable Usage by Business Unit web page 900 described above, system 100 may provide a Variable Usage by Model Type web page, wherein the report is based on the model type within the variable Business Unit. While such report is not shown, the values displayed in the Variable Classification columns are determined, in one embodiment, according to the combination of model type and the value selected in the Business Unit dropdown menu. The Variable Usage by Model Type report also includes a link to view variable count report containing the sum of variables under each variable classification.

Figure 11:
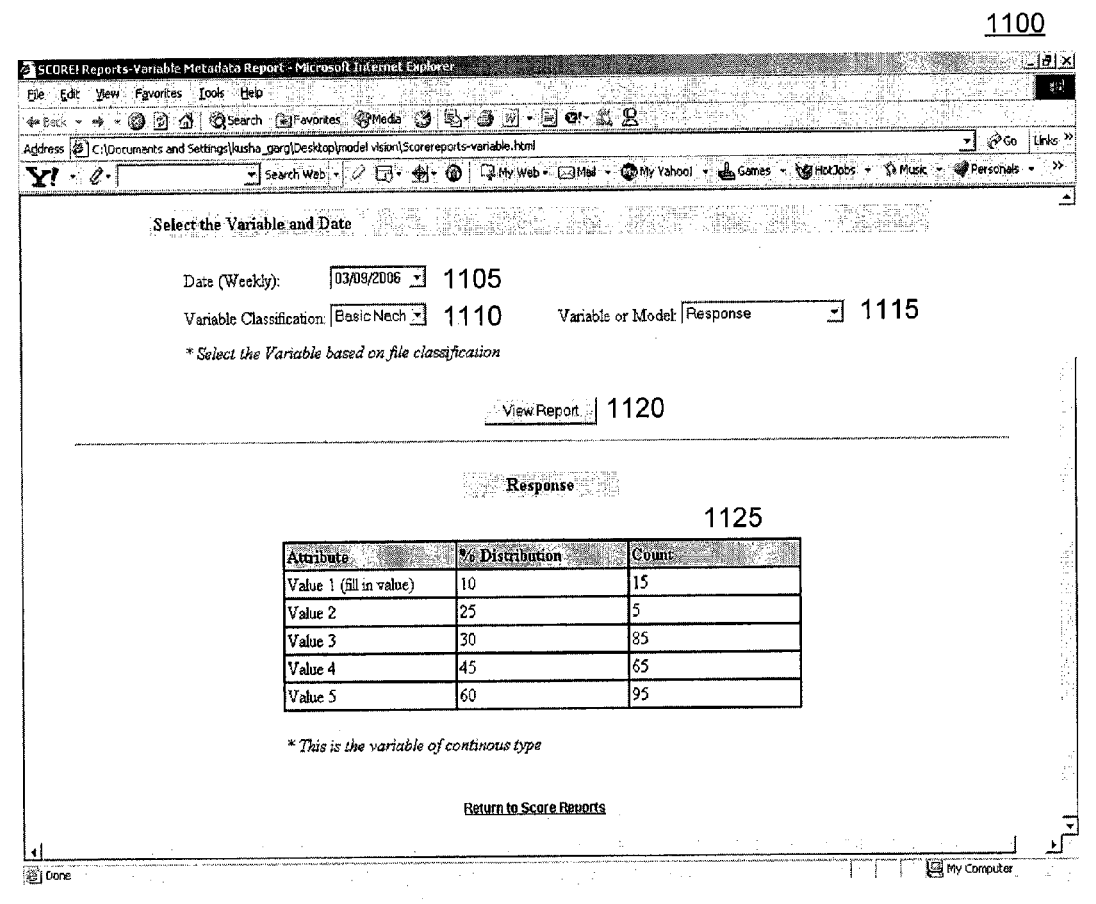

With reference to FIG. 11, when user 105 selects a link to view a variable metadata report, MVU 145 executes a query against model database 150 to retrieve values to populate a date dropdown menu, variable classification dropdown menu, and variable/model dropdown menu. After retrieving the values and populating the associated dropdown menu, user 105 is presented with the Variable Metadata Report web page 1100. This report enables user 105 to view metadata according to selection criteria that includes date 1105, variable classification 1110, and variable/model 1115. Selection of a "View Report" link 1120 invokes MVU 145 to execute a query against the Variables table 210 to determine the variable type. If the variable type belongs to the "Continuous" variable type, then MVU 145 issues a query against the Continue_Variables table 200. If the variable type belongs to the "Categorical" type, then MVU 145 issues a query against the Category_Variables table 205.

Values returned by MVU 145 are displayed in tabular form 1125 and includes columns for Attribute, Distribution Percentage, and Count. Such information provides valuable insight into the model and variable environments and for facilitating the institutionalization of customer behavior into corporate memory for strategic analysis. Analysis of variable metadata may provide insight for proactive identification of data anomalies, facilitation of strategy development and execution, population profiling prior to model development, and population profiling to determine population sizing, targeting, and segmentation.

Complex modeling environments can strain system performance, and the various interfaces and reports described above may be used to identify problematic models and variables. However, monitoring system performance at regular intervals will give an administrator advance notice as to potential problems or system degradation. In order to provide a proactive means for monitoring system performance, in one embodiment, system 100 includes a system performance report.

User 105 may select a link to access the System Performance Report web page 1200. The System Performance Report web page 1200 includes a month selection dropdown menu 1205 that is pre-loaded with the previous twelve months. Practitioners will appreciate that the month selection dropdown menu 1205 may be preloaded with any number of months depending on the record retention policy of the administering entity. Furthermore, practitioners will appreciate that a system performance report may be generated in accordance with any selected time interval. For example, the month selection dropdown menu 1205 may allow user 105 to select a day, week, or year. In one embodiment, the interface includes date selection dropdown menus; a first representing a start date, and a second representing an end date. Performance data would then be retrieved when it falls between the two selected dates.

In one embodiment, the user may select parameters to view a more specific subset of performance data. For example, user 105 may select a developer identifier, business unit, model type, or variable type in order to retrieve performance data related to the selection.

User 105 may select a month for which to view a system performance report and further select whether she would like to view the report in tabular 1210 or chart 1215 form. After selecting an "Execute" link 1220, MVU 145 executes a query against the Model_Sum table 255 to retrieve all records that fall within the selected month 1205. The retrieved performance data is transmitted to web client 110 where it is displayed within a table 1225. The table includes columns for displaying the weekday, date, number of models scored, time to score all models, average dataset generation time, average dataset transfer time, average model score time, and average model transfer time.

Monitoring system performance is vital in any organization where day-to-day operations rely on a network of computing systems and databases. In a complex modeling environment, modeling systems can become over-taxed, in time, leading to reduced system performance and additional expenditures directed toward the expansion of the computing infrastructure. As the business environment changes, some models and variables may become obsolete. Over time, obsolete or unused models can complicate the modeling environment and unnecessarily consume system resources. Moreover, as a modeling system grows with vast populations of models, managing the models becomes very difficult and time consuming. Without total insight into the modeling system, developers may continue to create models that already exist, thereby duplicating development efforts and taxing human resources. MCS 175 provides insight into model usage and human resource allocation in order to help administrators, project managers, and developers to maintain an efficient model and model development environment.

Providing a view into overall variable and model usage enables administrators to optimize system performance and technology investment, accelerate model development and execution, and accommodate a growing demand for new data and models.

Figure 13:
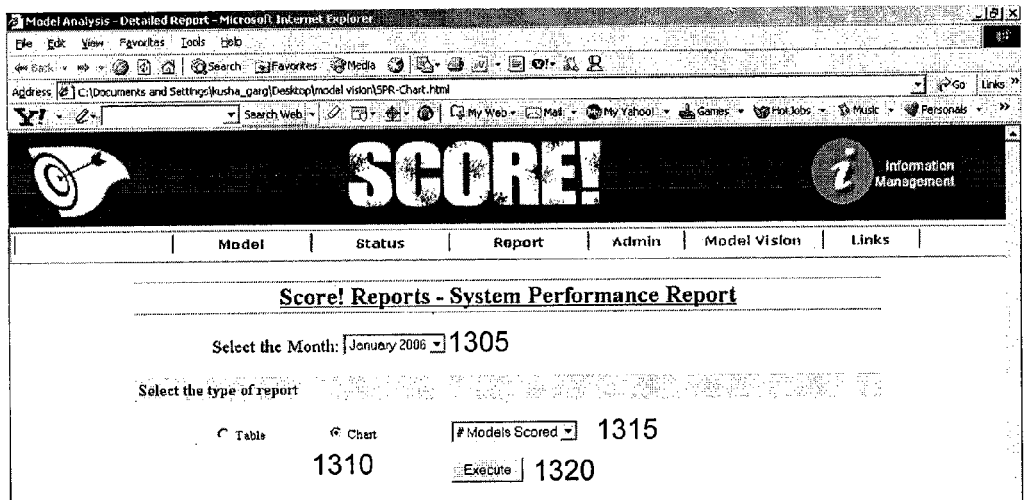
Figure 13:
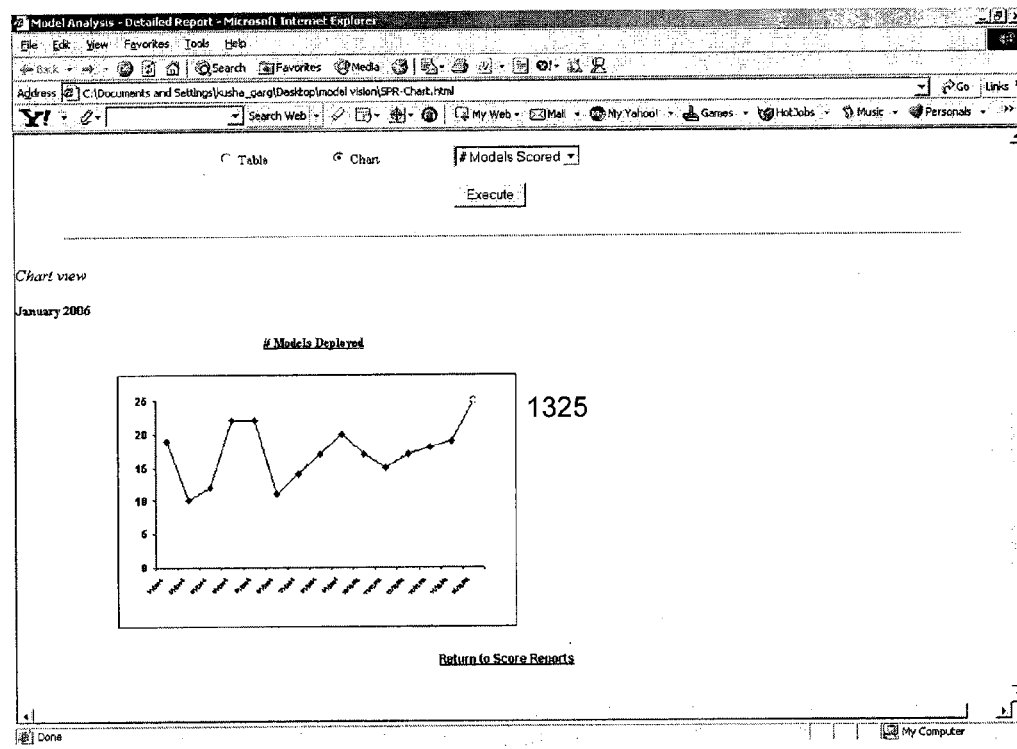

Referring to FIG. 13, user 105 may also view a system performance report in chart form by selecting a report month from the month selection dropdown 1305 on webpage 1300, selecting the "Chart" option 1310, and selecting a value from the Y-axis dropdown menu 1315. As the days falling within the selected month 1305 will be used for the X-axis, the Y-axis is selected by user 105 and may include, for example, number of models scored, time to score all models, average dataset generation time, and/or average model execution time. After selecting an "Execute" link 1320, MVU 145 executes a query against the Model_Sum table 255 to retrieve all records that fall within the selected month 1305. The retrieved performance data is formatted into a chart and is transmitted to web client 110 where it is displayed 1325.

Figure 14:
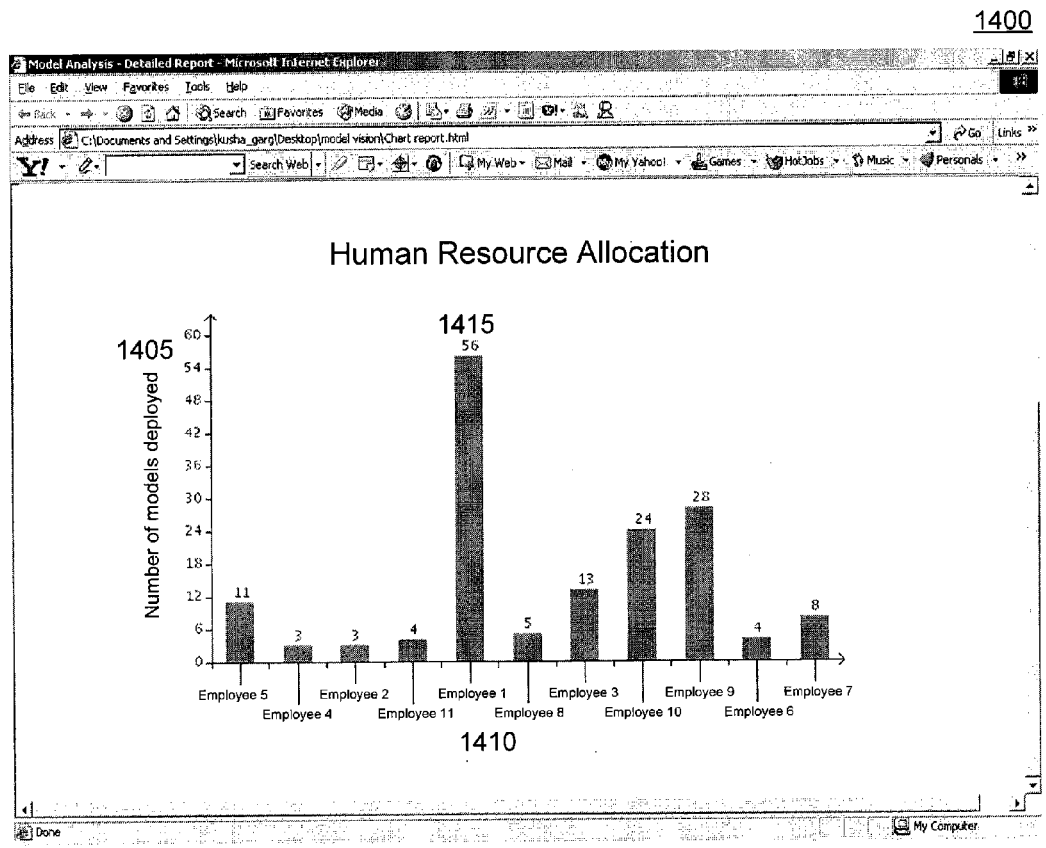
FIG. 14 is a screenshot of an exemplary interface for displaying a human resource allocation report in chart form, according to an embodiment of the present invention.

The ability to manage human resource allocation and performance is a critical function in a modeling development environment. Insight into how human resources are being allocated provides for succession planning for business continuity, reward and recognition, and the like. Referring to FIG. 14, when user 105 selects a link to view a Human Resources Allocation interface 1400, MVU 145 executes a query against the Model table 230 with a join to the Model_Owner table 245 to retrieve the full name for each developer of models in the Models table 230. The retrieved model owner data is formatted into a graph and is transmitted to web client 10 for viewing by user 105.

The Human Resources Allocation chart 1400 includes a horizontal axis (X-axis) 1410 representing each model owner name and a vertical axis (Y-axis) 1405 representing the number of models developed by each model owner. The Human Resource Allocation graph 1400 provides user 105 with an overview of how work among a number of developers is being allocated. For example, a project manager may view the graph to determine if any of her employees are being assigned workloads that are either to heavy or to light. With such information, the project manager may shift tasks among developers to increase the efficiency and/or productivity of the workforce. According to the example shown in FIG. 14, a project manager may assign fewer model development tasks to "Employee1" 1415 and assign more development tasks to the developers with fewer models to maintain. Practitioners will appreciate that human resource allocation information may be displayed in any number of formats, including tables, charts, and graphs.

In one embodiment, user 105 is presented with an interface to define the X-axis. For example, rather than view the Human Resource Allocation graph 1400 according to the number of models deployed, user 105 may prefer to view the graph in terms of the time to deployment, by model type, by business unit, and the like. Configuring the x-axis enables user 105 to drill in and view even more specific information that may be helpful in the task of human resource allocation.

With reference to FIG. 15, a Model Usage Report interface 1500 includes the display of the breakdown of models in terms of their frequency of use. As the Model Usage Report web page 1500 is loaded, MVU 145 executes a query against the model table 230 to retrieve model counts and usage data. In one embodiment, user 105 is presented with a model selection interface (not shown), wherein model subsets may be selected from the pool of stored models. The models selection interface may include pre-populated dropdown menus, for example, to enable user 105 to define selection parameters such as, for example, model type and usage timeframe.

The model usage report is displayed in tabular form that includes a vertical column 1520 which represents varying frequency codes from model table 230 such as, for example, "On Demand", "Daily", "Weekly", and "Monthly." Frequency codes classify models according to their intended usage. For example, a model designed to simulate card member spend based on a marketing campaign may utilize data from monthly spend, thus the model may be categorized as "Monthly."

MVU 145 also categorizes models according to predefined use intervals, indicative of when a model was most recently used. When a model is used, a date/timestamp field is updated in the Models table 230; therefore, each model is tested to determine if it has been used in the last month 1505, in the last two to three months 1510, or in the past four to five months 1515. Practitioners will appreciate that models may be categorized according to any number of frequency codes and/or use intervals. Viewing the Model Usage Report interface 1500, an administrator can quickly identify models to decommission in order to lift the burden of system resources.

In one embodiment, counts appearing in the cells of the Model Usage Report may include a hyperlink to view more specifics regarding the identity and characteristics of the models within the selected category. For example, an administrator may select the "On Demand" models that have not been used for "4-5 Months." With reference to FIG. 7, a Detailed Report web page 700 is constructed, wherein model details are displayed in tabular form 715 and include columns to display, for example, model identifier, model description, type, modeler identifier, business unit, frequency, population selection, target, record count, latest deployment date, and/or any other information that can be captured from the Model table 230 or related table.

Figure 16:
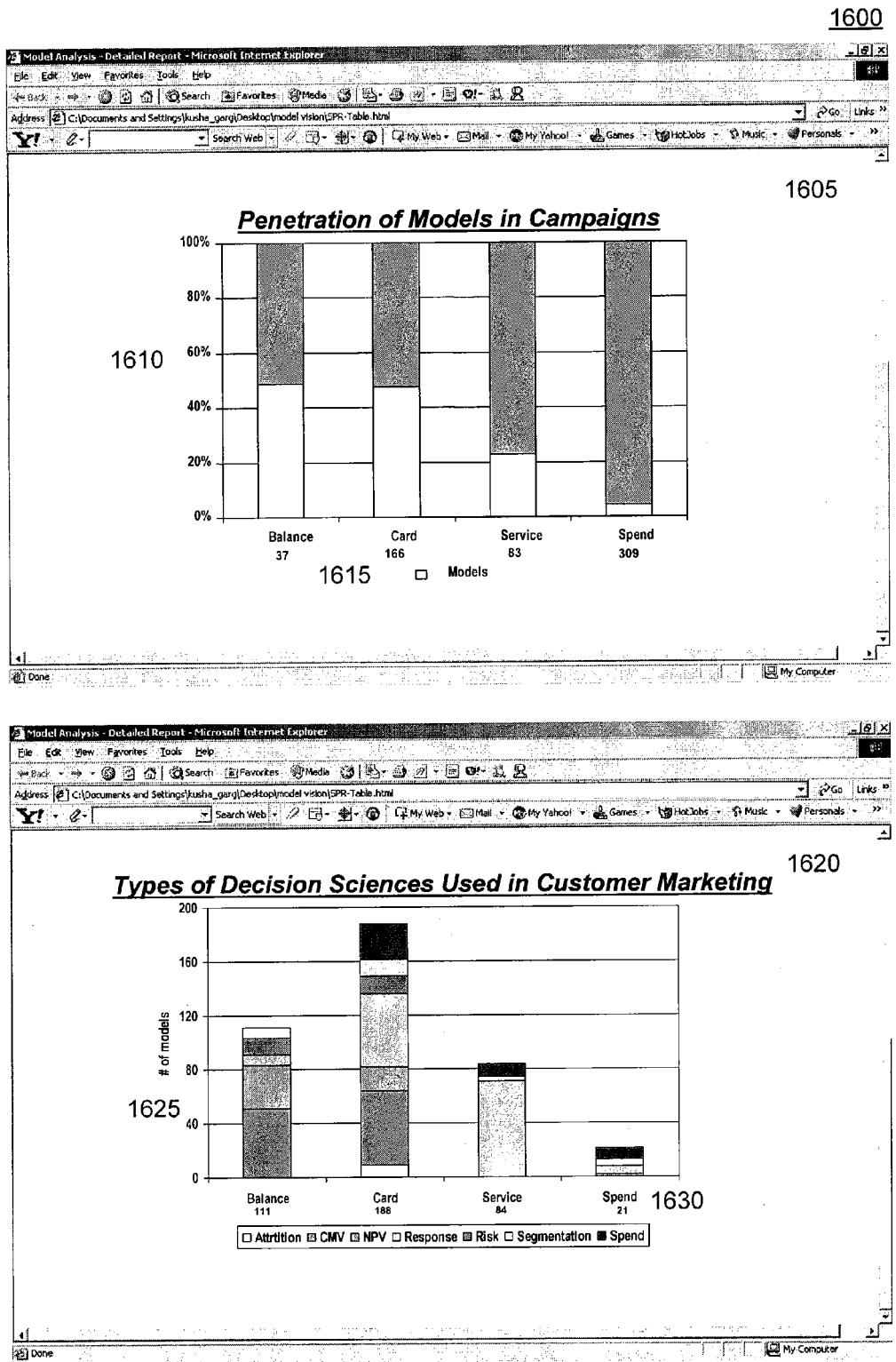

To provide insight into marketing campaign penetration and decision sciences, MVS 175 provides an interface to view graphs representative of the penetration of models in campaigns, the types of decision sciences used in customer marketing, and an overview of the number of models used in various campaigns. FIG. 16 is a screenshot showing two graphs that enable user 105 to analyze specific model usage in regard to marketing campaigns types. When user 105 selects a link to the penetration and decision sciences web page 1600, MVU 145 executes a query against the models table in model database 150 to retrieve data indicative of the types of campaigns which incorporate each model. MVU 145 categorizes this data and constructs a chart according to the user's 105 preferences, before constructing a web page to be displayed at web client 110. Practitioners will appreciate that an interface may be provided, whereby the user can select formatting, graphing, and/or charting preferences.

A "penetration of models in campaigns" graph 1605 includes a horizontal axis (X-axis) 1615 representing various categories of marketing campaigns and a vertical axis (Y-axis) 1610 representing the percentage of models used in each of the campaign categories. In the example presented at 1605, the overall percentage of models used for campaigns directed toward encouraging credit card holders to increase their spending is less than 5%. The percentage of models used in service related campaigns is approximately 22%. A raw number of models used among each classification of campaigns may further be displayed. Thus, the penetration of models in campaigns graph 1605 provides an easy-to-decipher, overall view of how models within a modeling environment are being used. For example, the graph 1605 may prompt an administrator to investigate why so few models are being used in spend related marketing campaigns.

In one embodiment, the various graph segments include a hyperlink that links to the Model Analysis Detailed Report (FIG. 7) where user 105 may view details relating to each of the models in the selected marketing campaign category. As such, user 105 may perform detailed analysis to further determine, for example, why there are so few/many models used in the selected marketing campaign category.

A "Types of Decision Sciences Used in Customer Marketing" graph 1620 includes a horizontal axis (X-axis) 1630 representing various categories of marketing campaigns and a vertical axis (Y-axis) 1625 representing the number of models used in each of the campaign categories. The X-axis is further subdivided to provide a more specific view into how models are being used in relation to specific decision sciences. In the example provided at 1620, user 105 can determine that for models used for campaigns directed toward encouraging credit card holders to increase their spending, a very small number (e.g., approximately five) of models are used for the "risk" decision science. Again, graph 1620 may prompt an administrator to investigate why so few models are being used in risk related decision sciences.

In one embodiment, the various graph segments include a hyperlink that links to the Model Analysis Detailed Report (FIG. 7), where user 105 may view details relating to each of the models in the selected decision sciences category. As such, user 105 may perform detailed analysis to further determine, for example, why there are so few/many models used in the selected decision sciences category.

While the screenshots and steps outlined above represent a specific embodiment of the invention, practitioners will appreciate that there are any number of computing algorithms and user interfaces that may be applied to create similar results. The steps are presented for the sake of explanation only and are not intended to limit the scope of the invention in any way.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. It should be understood that the detailed description and specific examples, indicating exemplary embodiments of the invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

As used herein, an element in the singular is not intended to mean "one and only one" unless explicitly so stated, but rather "one or more." Moreover, where a phrase similar to 'at least one of A, B, and C' is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

We claim:

1. A method for evaluating penetration in campaigns of a plurality of simulation models, said method including:
    analyzing, by a computer for evaluating said penetration in said campaigns of said plurality of simulation models, dependency data from said plurality of simulation models, each of said plurality of simulation models having a model identifier;
    determining, by said computer, first variables within a first subset of said plurality of simulation models, wherein said first subset of said plurality of simulation models is impacted by said dependency data, and said dependency data provides interdependencies among said plurality of simulation models, wherein said first variables are across said first subset of said plurality of simulation models, wherein said plurality of simulation models simulate outcomes, effectiveness, penetration, utilization, and distribution of marketing strategies based upon at least one of historic, current or probability data of said marketing strategies, and wherein said dependency data depends upon and includes records having are identifier that is based upon said model identifier and that depend at least one of directly or indirectly from a simulation model;
    analyzing, by said computer, said dependency data relating to said first subset of said plurality of simulation models;
    determining, by said computer, second variables within a second subset of said plurality of simulation models, wherein said second subset of said plurality of simulation models is impacted by said dependency data, wherein said second subset of said plurality of simulation models is dependent upon said first subset of said plurality of simulation models, and wherein said dependency data relates to a transfer of information exchanged between at least one of said first variables or said second variables, and at least one of said first subset of said plurality of simulation models or said second subset of said plurality of simulation models, wherein said information includes accuracy of said information, an amount of said information, a transfer rate of said information, a processing rate of said information, and usage data for each of variable types;
    propagating, by said computer and based on said dependency data and said interdependencies, a change to a select variable to at least one of said first subset of said plurality of simulation models or said second subset of said plurality of simulation models;
    acquiring, by said computer, model data that includes a simulation type indicator for each of said plurality of simulation models;
    categorizing, by said computer, said plurality of simulation models according to said simulation type indicator and said dependency data; and
    creating, by said computer, a visualization of said plurality of simulation models according to said categorization, wherein said visualization includes a count indicator respectively corresponding to each of said simulation type indicators, and wherein said visualization shows dependencies of said simulation model based upon said dependency data, wherein said dependencies are based upon how said simulation model utilizes said first subset of said plurality of simulation models and said second subset of said plurality of simulation models.

2. The method of claim 1, wherein said simulation type indicator is at least one of: balance, transfer, service, and spend.

3. The method of claim 1, wherein said count indicator includes at least one of: a model count and a model percentage.

4. The method of claim 1, wherein elements of said visualization are color-coded according to at least one of: status, modeler, model owner, business unit, model type, variable type, decommissioning status, decommissioning date, and deployment date.

5. The method of claim 1, further including receiving a request to decommission a model associated with said model data, wherein said request includes at least one of:
    decommission date, authorization request, model dependency data, variable dependency data, and model owner identifier.

6. The method of claim 5, wherein said model is decommissioned only in response to dependencies being resolved.

7. The method of claim 1, further including reading a request to decommission one of at least one of said first variables or said second variables associated with said model data, wherein said request includes at least one of: decommission date, authorization request, model dependency data, variable dependency data, and model owner identifier.

8. The method of claim 7, wherein said one of at least one of said first variables or said second variables is decommissioned only in response to dependencies being resolved.

9. The method of claim 1, wherein said model data is received from a plurality of modeling environments by at least one of: batch mode and real-time.

10. The method of claim 1, wherein said visualization is created according to at least one of: display color preferences, model display preferences, navigation preferences, sizing preferences, and zooming preferences.

11. The method of claim 1, further including:
reading said dependency data from each of said plurality of simulation models;
categorizing dependencies of said plurality of simulation models based upon said dependency data, wherein said dependencies are based upon how a simulation model utilizes other of said plurality of simulation models.

12. The method of claim 1, further including creating a visualization showing a plurality of variable names corresponding to said model data, wherein each of a plurality of variable values corresponding to each of said plurality of variable names is displayed in response to a processor event.

13. The method of claim 1, further including:
retrieving, from said model data, said dependency data in response to said model data including a variable name; and
categorizing a plurality of model names, wherein said model names are arranged according to said dependency data.

14. The method of claim 1, further including:
reading variable data. corresponding to said model data, wherein said variable data includes usage data for at least one of said first variables or said second variables;
classifying at least one of said first variables or said second variables according to said usage data to create variable types; and
determining usage statistics for each of said variable types.

15. The method of claim 1, further including:
reading performance data corresponding to said model data, wherein said performance data includes model scoring data, model execution data, and dataset generation data for a plurality of simulation models; and
determining averages for said performance data based on defined time intervals.

16. The method of claim 1, further including:
retrieving, from said model data, identifiers for a plurality of model developers;
categorizing said identifiers according to an allocation type identifier, wherein said categorization includes allocation of human resources based upon said allocation type identifier.

17. The method of claim 1, further including:
retrieving, from said model data, a last usage date for each of said plurality of simulation models; and
categorizing each of said plurality of simulation models according to said last usage date.

18. The method of claim 1, further comprising receiving, by said computer, one or more selection parameters and a presentation parameter, wherein the one or more selection parameters are used to query a model database and retrieve model data.

19. A system for evaluating penetration in campaigns of a plurality of simulation models, said system comprising:
a tangible, non-transitory memory communicating with a processor for said evaluating penetration in said campaigns of said plurality of simulation models; and
said tangible, non-transitory memory having instructions stored thereon that, in response to execution by said processor, cause said processor to perform operations comprising:
analyzing, by said processor, dependency data from said plurality of simulation models, each of said plurality of simulation models having a model identifier;
determining, by said processor, first variables within a first subset of said plurality of simulation models, wherein said first subset of said plurality of simulation models is impacted by said dependency data, and said dependency data provides interdependencies among said plurality of simulation models, wherein said first variables are across said first subset of said plurality of simulation models, wherein said plurality of simulation models simulate outcomes, effectiveness, penetration, utilization, and distribution of marketing strategies based upon at least one of historic, current or probability data of said marketing strategies, and wherein said dependency data depends upon and includes records having an identifier that is based upon said model identifier and that depend at least one of directly or indirectly from a simulation model;
analyzing, by said processor, said dependency data relating to said first subset of said plurality of simulation models;
determining, by said processor, second variables within a second subset of said plurality of simulation models, wherein said second subset of said plurality of simulation models is impacted by said dependency data, wherein said second subset of said plurality of simulation models is dependent upon said first subset of said plurality of simulation models, and wherein said dependency data relates to a transfer of information exchanged between at least one of said first variables or said second variables, and at least one of said first subset of said plurality of simulation models or said second subset of said plurality of simulation models, wherein said information includes accuracy of said information, an amount of said information, a transfer rate of said information, a processing rate of said information, and usage data for each of variable types;
propagating, by said processor and based on said dependency data and said interdependencies, a change to a select variable to at least one of said first subset of said plurality of simulation models or said second subset of said plurality of simulation models;
acquiring, by said processor, model data that includes a simulation type indicator for each of said plurality of simulation models;
categorizing, by said processor, said plurality of simulation models according to said simulation type indicator and said dependency data; and
creating, by said processor, a visualization of said plurality of simulation models according to said categorization, wherein said visualization includes a count indicator respectively corresponding to each of said simulation type indicators, and Wherein said visualization shows dependencies of said simulation model based upon said dependency data, wherein said dependencies arc based upon how said simulation model utilizes said first subset of said plurality of simulation models and said second subset of said plurality of simulation models.

20. A non-transitory, tangible computer-readable storage medium having computer-executable instructions stored thereon that, if executed by a computer for evaluating penetration in campaigns of a plurality of simulation models, cause said computer to perform operations comprising:
analyzing, by said computer, dependency data from said plurality of simulation models, each of said plurality of simulation models having a model identifier;
determining, by said computer, first variables within a first subset of said plurality of simulation models, wherein said first subset of said plurality of simulation models is impacted by said dependency data, and said dependency data provides interdependencies among said plurality of simulation models, wherein said first variables are across said first subset of said plurality of simulation models, wherein said plurality of simulation models simulate outcomes, effectiveness, penetration, utilization, and distribution of marketing strategies based upon at least one of historic, current or probability data of said marketing strategies, and wherein said dependency data depends upon and includes records having an identifier that is based upon said model identifier and that depend at least one of directly or indirectly from a simulation model;

analyzing, by said computer, said dependency data relating to said first subset of said plurality of simulation models;

determining, by said computer, second variables within a second subset of said plurality of simulation models, wherein said second subset of said plurality of simulation models is impacted by said dependency data, wherein said second subset of said plurality of simulation models is dependent upon said first subset of said plurality of simulation models, and wherein said dependency data relates to a transfer of information exchanged between at least one of said first variables or said second variables, and at least one of said first subset of said plurality of simulation models or said second subset of said plurality of simulation models, wherein said information includes accuracy of said information, an amount of said information, a transfer rate of said information, a processing rate of said information, and usage data for each of variable types;

propagating, by said computer and based on said dependency data and said interdependencies, a change to a select variable to at least one of said first subset of said plurality of simulation models or said second subset of said plurality of simulation models;

acquiring, by said computer, model data that includes a simulation type indicator for each of said plurality of simulation models;

categorizing, by said computer, said plurality of simulation models according to said simulation type indicator and said dependency data; and creating, by said computer, a visualization of said plurality of simulation models according to said categorization, wherein said visualization includes a count indicator respectively corresponding to each of said simulation type indicators, and wherein said visualization shows dependencies of said simulation model based upon said dependency data, wherein said dependencies are based upon how said simulation model utilizes said first subset of said plurality of simulation models and said second subset of said plurality of simulation models.

* * * * *

UNITED STATES PATENT AND TRADEMARK OFFICE
CERTIFICATE OF CORRECTION

| | | |
|---|---|---|
| PATENT NO. | : 8,170,847 B2 | Page 1 of 1 |
| APPLICATION NO. | : 11/619947 | |
| DATED | : May 1, 2012 | |
| INVENTOR(S) | : Manisha Jain et al. | |

It is certified that error appears in the above-identified patent and that said Letters Patent is hereby corrected as shown below:

On the Title page, section (57), line 6, please delete "(original)".

On the Title page, section (57), lines 12-13, please delete "retuning" and insert therefor --returning--.

Signed and Sealed this
Third Day of July, 2012

David J. Kappos
*Director of the United States Patent and Trademark Office*